United States Patent
Shreevastav et al.

(10) Patent No.: US 12,082,096 B2
(45) Date of Patent: Sep. 3, 2024

(54) ENHANCED ON-DEMAND REQUEST PROCEDURES FOR OBTAINING VARIOUS SYSTEM INFORMATION

(71) Applicant: Telefonaktiebolaget LM Ericsson (publ), Stockholm (SE)

(72) Inventors: Ritesh Shreevastav, Upplands Väsby (SE); Antonino Orsino, Kirkkonummi (FI); Jens Bergqvist, Linköping (SE); Mattias Bergström, Sollentuna (SE); Sara Modarres Razavi, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 200 days.

(21) Appl. No.: 17/637,962

(22) PCT Filed: Sep. 7, 2020

(86) PCT No.: PCT/SE2020/050840
§ 371 (c)(1),
(2) Date: Feb. 24, 2022

(87) PCT Pub. No.: WO2021/054883
PCT Pub. Date: Mar. 25, 2021

(65) Prior Publication Data
US 2022/0279425 A1 Sep. 1, 2022

Related U.S. Application Data

(60) Provisional application No. 62/900,902, filed on Sep. 16, 2019.

(51) Int. Cl.
*H04W 48/04* (2009.01)
*G01S 19/10* (2010.01)
(Continued)

(52) U.S. Cl.
CPC ............. *H04W 48/04* (2013.01); *G01S 19/10* (2013.01); *H04W 48/06* (2013.01); *H04W 74/0833* (2013.01); *H04W 76/20* (2018.02)

(58) Field of Classification Search
CPC ........ G01S 19/04; G01S 19/10; G01S 5/0236; H04W 48/04; H04W 48/06; H04W 48/14; H04W 74/0833; H04W 76/20
See application file for complete search history.

(56) References Cited

U.S. PATENT DOCUMENTS 11,212,784 B2 * 12/2021 Ishii ..................... H04W 72/21
2018/0103369 A1 4/2018 Chou
(Continued)

FOREIGN PATENT DOCUMENTS

| CN | 110169135 A | 8/2019 |
| WO | 2018203633 A1 | 11/2018 |
| WO | 2019068795 A1 | 4/2019 |

OTHER PUBLICATIONS

"3GPP TS 36.355 V15.4.0", 3rd Generation Partnership Project; Technical Specification Group Radio Access Network; Evolved Universal Terrestrial Radio Access (E-UTRA); LTE Positioning Protocol (LPP) (Release 15), Jun. 2019, pp. 1-224.
(Continued)

*Primary Examiner* — Liton Miah
(74) *Attorney, Agent, or Firm* — Murphy, Bilak & Homiller, PLLC

(57) ABSTRACT

Embodiments include methods for a network node, of a radio access network (RAN), that provides a cell serving one or more user equipment (UEs). Such methods include determining a restriction to requests for on-demand delivery of system information blocks (SIBs) by at least one UE operating in the cell; and transmitting, to the at least one UE, one or more parameters associated with the restriction. Exemplary parameters include prohibit timer values and maxi-
(Continued)

mum number of SIBs or SIB segments that a UE can request. Other embodiments include complementary methods whereby a UE can transmit, to the network node, a request for on-demand delivery of one or more particular SIBs in accordance with the received parameters associated with the restriction. Other embodiments include network nodes and UEs configured to perform such methods.

23 Claims, 12 Drawing Sheets

(51) Int. Cl.
*H04W 48/06* (2009.01)
*H04W 74/08* (2024.01)
*H04W 74/0833* (2024.01)
*H04W 76/20* (2018.01)

(56) References Cited

U.S. PATENT DOCUMENTS

| | | | |
|---|---|---|---|
| 2018/0343572 | A1 | 11/2018 | Basu Mallick et al. |
| 2019/0274093 | A1* | 9/2019 | Xiao ................... H04W 48/14 |
| 2019/0357119 | A1 | 11/2019 | Hong et al. |
| 2019/0394691 | A1* | 12/2019 | Shih ................... H04W 36/0072 |
| 2019/0394693 | A1* | 12/2019 | Kim ................... H04W 36/14 |
| 2020/0100311 | A1* | 3/2020 | Cirik ................... H04W 72/23 |
| 2020/0314793 | A1* | 10/2020 | Kumar ................ H04W 64/003 |

OTHER PUBLICATIONS

"Discussions on on-demand SI request and delivery in RRC_CONECTED", 3GPP TSG-RAN WG2 Meeting #107, R2-1911316, Prague, Czech Republic, Aug. 26-30, 2019, pp. 1-2.

"Introduction of capability for on-demand SIB(s) procedure in CONNECTED", 3GPP TSG-RAN WG2 Meeting #110-e, R2-2005901, Electronic Meeting, Jun. 1-12, 2020, pp. 1-4.

"Introduction of capability for on-demand SIB(s) procedure in Connected", 3GPP TSG-RAN WG2 Meeting #110-e, R2-2005900, Electronic Meeting, Jun. 1-12, 2020, pp. 1-6.

"Introduction of on-demand SIB(s) procedure in Connected", 3GPP TSG-RAN WG2 Meeting #110-e, R2-2005899, Electronic meeting, Jun. 1-12, 2020, pp. 1-842.

"Introduction of on-demand SIB(s) procedure in RRC_CONNECTED", 3GPP TSG-RAN WG2 #110-e, R2-2005898, Electronic Meeting, Jun. 1-12, 2020, pp. 1-4.

"Leftover Issues for RACH Report Optimization", 3GPP TSG-RAN WG2 Meeting #108, R2-1914499, Reno, USA, Nov. 18-22, 2019, pp. 1-4.

"Summary of [107#42][NR/Rel-16] On demand SI in connected", 3GPP TSG-RAN WG2 #107bis, Tdoc R2-191xxxx, Chongqing, China, Oct. 14-18, 2019, pp. 1-15.

"3GPP TS 38.401 V15.6.0", 3rd Generation Partnership Project; Technical Specification Group Radio Access Network; NG-RAN; Architecture description (Release 15), Jul. 2019, pp. 1-46.

"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.

"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.

"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

\* cited by examiner

```
-- ASN1START
-- TAG-OTHER-SI-INFO-START

SIBXX-Pos-r16 ::=                SEQUENCE {
    posSchedulingInfoList-r16        SEQUENCE (SIZE (1..maxSI-Message)) OF PosSchedulingInfo-r16,
    posSI-dedicatedSystemInformationDelivery     BOOLEAN,
    posSI-RequestWaitDuration        ENUMERATED {t10, t20, t30, t40}                    OPTIONAL --Need R
    posSI-NumberOfSIRequest          ENUMERATED {n1, n2, n3, n4, n5, n6, n7, n8}        OPTIONAL --Need R,
    posSI-SegmentNumber              INTEGER {1..maxNumSibSegment}                      OPTIONAL --Need R,
    ...
}

PosSchedulingInfo-r16 ::=        SEQUENCE {
    posSI-Deliverytatus              ENUMERATED {broadcasting, notBroadcasting, unicast},
    posSI-Periodicity-r16            ENUMERATED {rf8, rf16, rf32, rf64, rf128, rf256, rf512},
    posSIB-MappingInfo-r16           PosSIB-MappingInfo-r16,
    posSI-RequestRate                ENUMERATED {t1, t2, t4, t8}                        OPTIONAL --Need R
}

PosSIB-MappingInfo-r16 ::=       SEQUENCE (SIZE (1..maxSIB)) OF PosSIB-Type-r16

PosSIB-Type-r16 ::=              SEQUENCE {
    encrypted-r16                    ENUMERATED { true }               OPTIONAL,    -- Need OP
    gnss-id-r16                      GNSS-ID-r16                       OPTIONAL,    -- Need OP
    sbas-id-r16                      SBAS-ID-r16                       OPTIONAL,    -- Need OP
    posSibType-r16                   ENUMERATED {
                                         posSibType1-1, posSibType1-2, posSibType1-3, posSibType1-4,
                                         posSibType1-5, posSibType1-6, posSibType1-7, posSibType2-1,
                                         posSibType2-2, posSibType2-3, posSibType2-4, posSibType2-5,
                                         posSibType2-6, posSibType2-7, posSibType2-8, posSibType2-9,
                                         posSibType2-10, posSibType2-11, posSibType2-12, posSibType2-13,
                                         posSibType2-14, posSibType2-15, posSibType2-16, posSibType2-17,
                                         posSibType2-18, posSibType2-19, posSibType3-1, ....},
    ...
}

-- TAG-OTHER-SI-INFO-STOP
-- ASN1STOP
```

FIG. 8

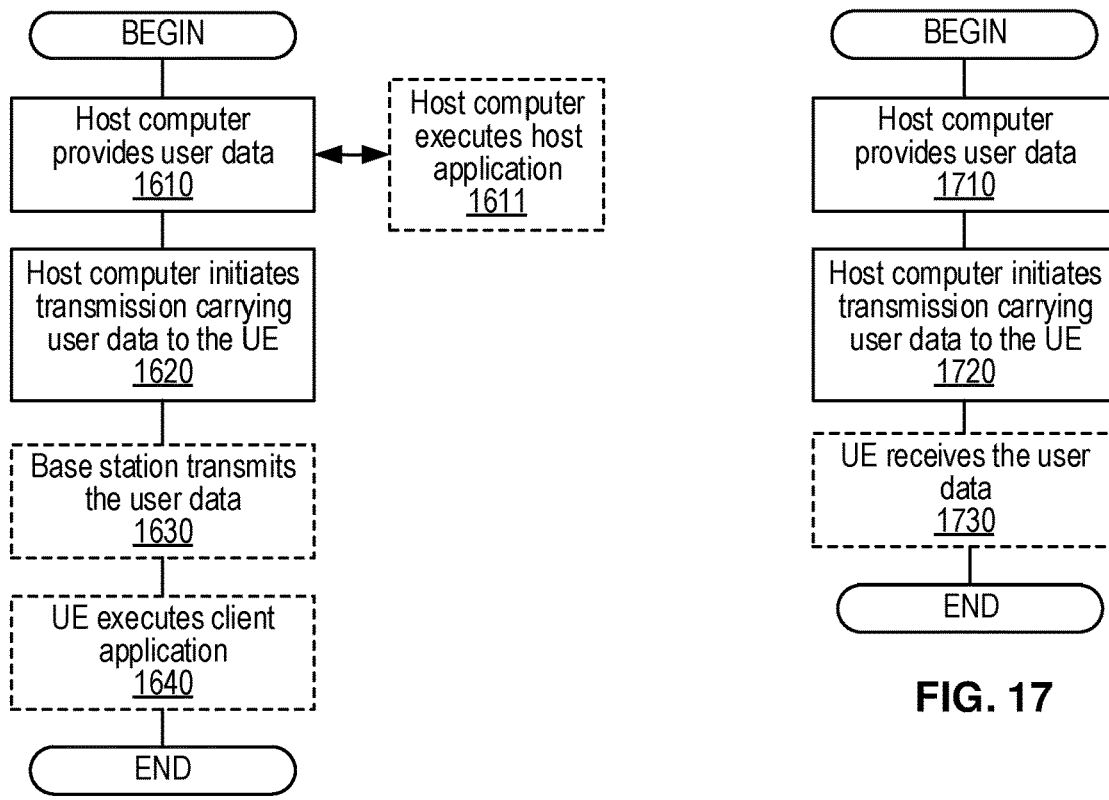
FIG. 16
FIG. 17
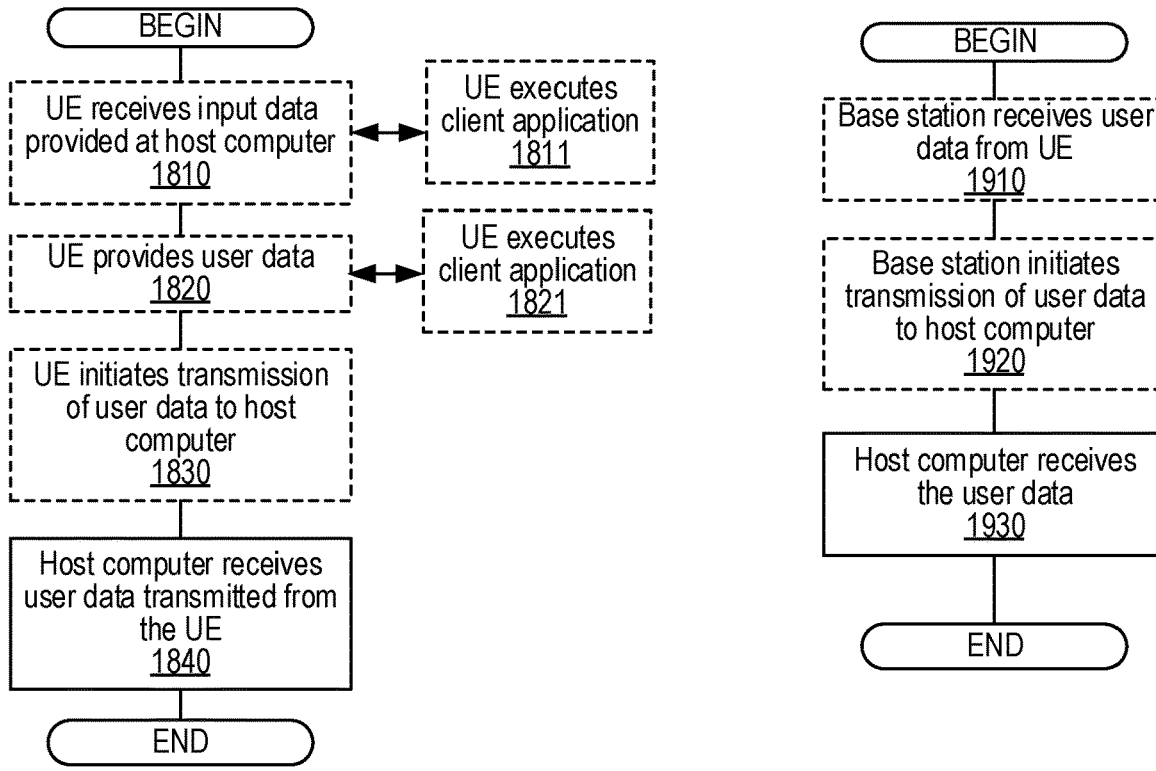
FIG. 18
FIG. 19

ENHANCED ON-DEMAND REQUEST PROCEDURES FOR OBTAINING VARIOUS SYSTEM INFORMATION

TECHNICAL FIELD

The present application relates generally to the field of wireless communication networks, and more specifically to more efficient ways for user equipment (UEs) to system information on an as-needed basis (e.g., on demand) from a wireless communication network.

BACKGROUND

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-low latency critical communications (URLCC), side-link device-to-device (D2D), and several other use cases. The present disclosure relates generally to NR, but the following description of previous-generation technology is provided for context since it shares many features with NR.

Long Term Evolution (LTE) is an umbrella term for so-called fourth generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Rel-10 supports bandwidths larger than 20 MHz. One important requirement on Rel-10 is to backward compatibility with LTE Rel-8. This also includes spectrum compatibility in which a wideband LTE Rel-10 carrier (e.g., wider than 20 MHz) should appear as multiple carriers to an LTE Rel-8 ("legacy") terminal ("user equipment" or UE). Each such carrier can be referred to as a Component Carrier (CC). For efficient usage, legacy terminals can be scheduled in all parts of the wideband LTE Rel-10 carrier. This can be done by Carrier Aggregation (CA), in which a Rel-10 terminal receives multiple CCs, each having the same structure as a Rel-8 carrier. LTE Rel-12 introduced dual connectivity (DC) whereby a UE can be connected to two network nodes simultaneously, thereby improving connection robustness and/or capacity.

In LTE DC, a UE is configured with a Master Cell Group (MCG) associated with the MeNB and a Secondary Cell Group (SCG) associated with the SeNB. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the primary SCell (PSCell) of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access (CBRA) by a UE.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs (e.g., UE 120) in uplink and downlink, as well as security of the communications with UEs. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MME/S-GWs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The IT returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). A combination of a particular subcarrier in a particular symbol is known as a resource element (RE). Each RE is used to transmit a particular number of bits, depending on the type of modulation and/or bit-mapping constellation used for that RE. The radio resources of the LTE PHY are also defined in terms of physical resource blocks (PRBs). Each PRB spans $N^{RB}_{sc}$ sub-carriers over the duration of a slot (i.e., $N^{DL}_{symb}$ or $N^{DL}_{symb}$ symbols), where $N^{RB}_{sc}$ is typically either 12 or 24.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Fifth-generation NR technology shares many features with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE that has some properties similar to a "suspended" condition for LTE.

In addition to providing coverage via cells, as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

On-demand System information (SI) request is a feature in NR that allows the network to only broadcast some of the SI messages (referred to as "SI blocks" or "SIBs") when there is a UE needing to acquire them. The UE then requests SIBs with the needed content using procedures related to random-access. This is referred to as an "on-demand" SI request and allows the network to minimize broadcast overhead by avoiding broadcasting SIBs that no UE currently requires. In addition, some of the SIBs can be provided to the UE by dedicated signalling, e.g., via an RRC-ConnectionReconfiguration message.

Work is ongoing in 3GPP to introduce support for on-demand delivery of SI via a unicast mechanism, which can include an on-demand request while a UE is in RRC_CONNECTED state followed by dedicated signaling of the requested SIBs. In this manner, on-demand SI delivery will be available via both broadcast and unicast mechanisms. However, some of the contents of the SIBs could change quickly, such that a UE may need to make frequent on-demand requests to acquire it. However, there is currently no way to limit UE on-demand SI requests and to systematically determine whether delivery will be via unicast or broadcasting mechanism.

SUMMARY

Accordingly, exemplary embodiments of the present disclosure address these and other problems, issues, and/or drawbacks related to UE on-demand requests for system information (SI), such as for positioning assistance.

Embodiments include exemplary methods (e.g., procedures) for a network node, of a radio access network (RAN), that provides a cell serving one or more user equipment (UEs). These exemplary methods can include determining a restriction to requests for on-demand delivery of system information blocks (SIBs) by at least one UE operating in the cell. These exemplary methods can also include transmitting, to the at least one UE, one or more parameters associated with the restriction.

In some embodiments, the one or more parameters can include any of the following:
- a prohibit timer value that indicates a duration, after a UE requests on-demand delivery of one or more SIBs, until the UE can request on-demand delivery of one or more further SIBs; and
- a maximum number of SIBs or SIB segments that a UE can request for on-demand delivery.

In some embodiments, the restriction comprises enabling or disabling requests for on-demand delivery of SIBs individually for each of the at least one UE.

In some embodiments, the restriction can be for requests for on-demand delivery of SIBs during UE operation in RRC_CONNECTED state. In such embodiments, the one or more parameters are transmitted in respective RRCReconfiguration messages to the at least one UE. In some of these embodiments, transmitting the one or more parameters in an RRCReconfiguration message to a particular UE can indicate that requests for on-demand delivery of SIBs are enabled for the particular UE.

In some embodiments, SIBs available for on-demand delivery can include global navigation satellite system (GNSS) positioning assistance information. In such embodiments, determining the restriction can be based on a duration between updates of real-time kinematic (RTK) information comprising the GNSS positioning assistance information.

In some embodiments, these exemplary methods can also include determining a utilization condition for resources associated with the cell. In such embodiments, the restriction can be determined based on the utilization condition. For example, the utilization condition can be for signaling radio bearer (SRB) resources or random-access channel (RACH) resources.

In other embodiments, these exemplary methods can also include obtaining respective QoS requirements for the at least one UE. In such embodiments, the restriction for the at least one UE comprises respective restrictions based on the respective QoS requirements. For example, each UE's restriction requirement can be based on that UE's QoS requirement.

In some of these embodiments, determining the restriction can include comparing the respective QoS requirements (i.e., for the respective UEs) to a threshold; determining that requests for on-demand delivery of SIBs are enabled for UEs whose QoS requirement is greater than or equal to the threshold; and determining that requests for on-demand delivery of SIBs are disabled for UEs whose QoS requirement is less than the threshold.

In some embodiments, these exemplary methods can also include receiving, from a particular UE, a request for on-demand delivery of one or more particular SIBs in accordance with the parameters associated with the restriction; and transmitting the requested one or more particular SIBs to the UE via broadcast or dedicated signaling. In some embodiments, the one or more particular SIBs can include global navigation satellite system (GNSS) positioning assistance information.

Other embodiments include exemplary methods (e.g., procedures) for a user equipment (UE) operating in a cell provided by a network node in a radio access network (RAN). These exemplary methods can include receiving, from the network node, one or more parameters associated with a restriction to requests, by at least the UE, for on-demand delivery of system information blocks (SIBs) by the network node. These exemplary methods can also include transmitting, to the network node, a request for on-demand delivery of one or more particular SIBs in accordance with the parameters associated with the restriction. In some embodiments, these exemplary methods can also include receiving the requested one or more particular SIBs from the network node via broadcast or dedicated signaling.

In some embodiments, the one or more parameters can include any of the following:
- a prohibit timer value that indicates a duration, after a UE requests on-demand delivery of one or more SIBs, until the UE can request on-demand delivery of one or more further SIBs; and
- a maximum number of SIBs or SIB segments that a UE can request for on-demand delivery.

In some of these embodiments, these exemplary methods can also include starting a timer, based on the received prohibit timer value, in relation to a previous request for on-demand delivery for one or more previous SIBs. In such embodiments, transmitting the request in accordance with the parameters can include determining that the prohibit timer has expired before transmitting the request. Furthermore, in some of these embodiments, the one or more (requested) particular SIBs comprise a plurality of SIBs or SIB segments less than or equal to the maximum number.

In some embodiments, the restriction can be for requests for on-demand delivery of SIBs during UE operation in RRC_CONNECTED state. In such embodiments, the one or more parameters can be received in an RRCReconfiguration message. In some of these embodiments, transmitting the request can be based on an indication that requests for on-demand delivery of SIBs are enabled for the UE. This indication can be based on receiving the one or more parameters in the RRCReconfiguration message. In other words, receiving an RRCReconfiguration message with the parameters can indicate that requests for on-demand delivery are enabled for the UE.

In some embodiments, the one or more (requested) particular SIBs can include global navigation satellite system (GNSS) positioning assistance information. In such embodiments, the request for on-demand delivery of the one or more particular SIBs can be transmitted in response to initiating a GNSS positioning procedure. In some of these embodiments, the restriction can be related to a duration between updates of real-time kinematic (RTK) information comprising the GNSS positioning assistance information.

In some embodiments, the UE can be operating in RRC_CONNECTED state with a QoS requirement and the restriction can be based on the UE's QoS requirement.

Other embodiments include network nodes (e.g., base stations, eNBs, gNBs, ng-eNBs, etc. or components thereof) or user equipment (UEs, e.g., wireless devices) configured to perform operations corresponding to any of the exemplary methods described herein. Other embodiments include non-transitory, computer-readable media storing computer-executable instructions that, when executed by processing circuitry of a network node or a UE, configure the same to perform operations corresponding to any of the exemplary methods described herein.

These and other objects, features, and advantages of the embodiments of the present disclosure will become apparent upon reading the following Detailed Description in view of the Drawings briefly described below.

BRIEF DESCRIPTION OF THE DRAWINGS

FIG. 8 shows an ASN.1 data structure for an exemplary system information block (SIB) used to convey scheduling information pertaining to positioning-related SI (e.g., assistance data), according to various exemplary embodiments of the present disclosure.

FIG. 16-19 are flow diagrams illustrating various exemplary methods (e.g., procedures) for a communication system, according to various exemplary embodiments of the present disclosure.

DETAILED DESCRIPTION

Figure 1:
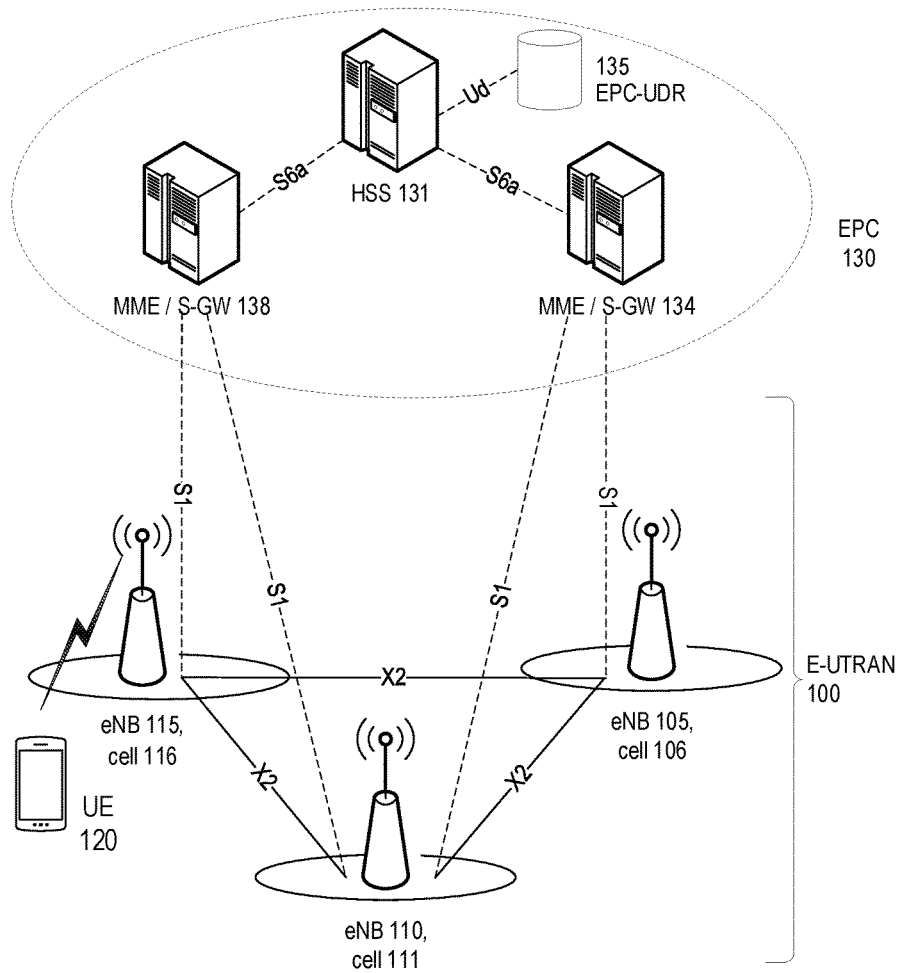
FIG. 1 is a high-level block diagram of an exemplary architecture of the Long-Term Evolution (LTE) Evolved UTRAN (E-UTRAN) and Evolved Packet Core (EPC) network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (SMF), a user plane function (UPF), a network exposure function (NEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, D2D UEs, V2X UEs, etc. Unless otherwise noted, the term "wireless device" is used interchangeably herein with the term "user equipment" (or "UE" for short).

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, on-demand delivery of system information (SI) by unicast is a desirable feature for NR networks because it allows a network to avoid broadcasting information that no UE currently requires, thereby making broadcast more efficient. Even to, there is currently no way to limit UE on-demand requests for system information (SI) and to systematically determine whether delivery of the requested SI will be via unicast or broadcast. These issues are discussed in more detail below following an description of 5G/NR network architectures.

Figure 2:
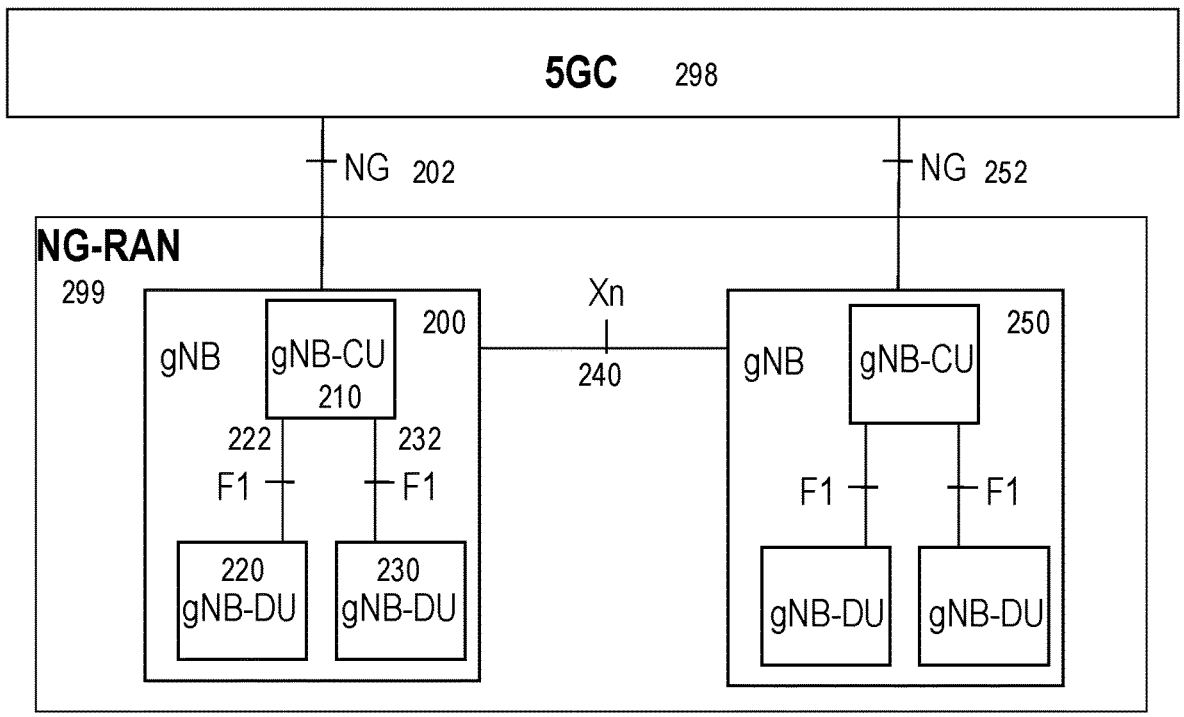
FIGS. 2-3 show two high-level view of an exemplary 5G network architecture, including a Next Generation Radio Access Network (NG-RAN) and a 5G Core (5GC).

FIG. 2 illustrates a high-level view of the 5G network architecture, consisting of a Next Generation RAN (NG-RAN) 299 and a 5G Core (5GC) 298. NG-RAN 299 can include a set of gNodeB's (gNBs) connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 250. With respect to the NR interface to UEs, each of the gNBs can support frequency division duplexing (FDD), time division duplexing (TDD), or a combination thereof.

The NG RAN logical nodes shown in FIG. 2 (and described in 3GPP TS 38.401 and 3GPP TR 38.801) include a central (or centralized) unit (CU or gNB-CU) and one or more distributed (or decentralized) units (DU or gNB-DU). For example, gNB 200 in FIG. 2 includes gNB-CU 210 and gNB-DUs 220 and 230. A gNB-CU connects to gNB-DUs over respective F1 logical interfaces, such as interfaces 222 and 232 shown in FIG. 2. The gNB-CU and connected gNB-DUs are only visible to other gNBs and the 5GC as a gNB, e.g., the F1 interface is not visible beyond gNB-CU.

CUs are logical nodes that host higher-layer protocols and perform various gNB functions such controlling the operation of DUs. Exemplary higher-layer protocols hosted by a CU include higher-layer protocols such as, e.g., F1 application part protocol (F1-AP), Stream Control Transmission Protocol (SCTP), GPRS Tunnelling Protocol (GTP), Packet Data Convergence Protocol (PDCP), User Datagram Protocol (UDP), Internet Protocol (IP), and Radio Resource Control (RRC) protocol. In contrast, DUs are logical nodes that host lower-layer protocols such as Radio Link Control (RLC), Medium Access Control (MAC), and physical-layer (PHY) protocols. Depending on the functional split, DUs can also host and/or provide various subsets of gNB functions.

Other protocol distributions between CU and DU are possible, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Regardless of protocol distribution, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (3GPP TS 33.401) shall be applied.

Figure 3:
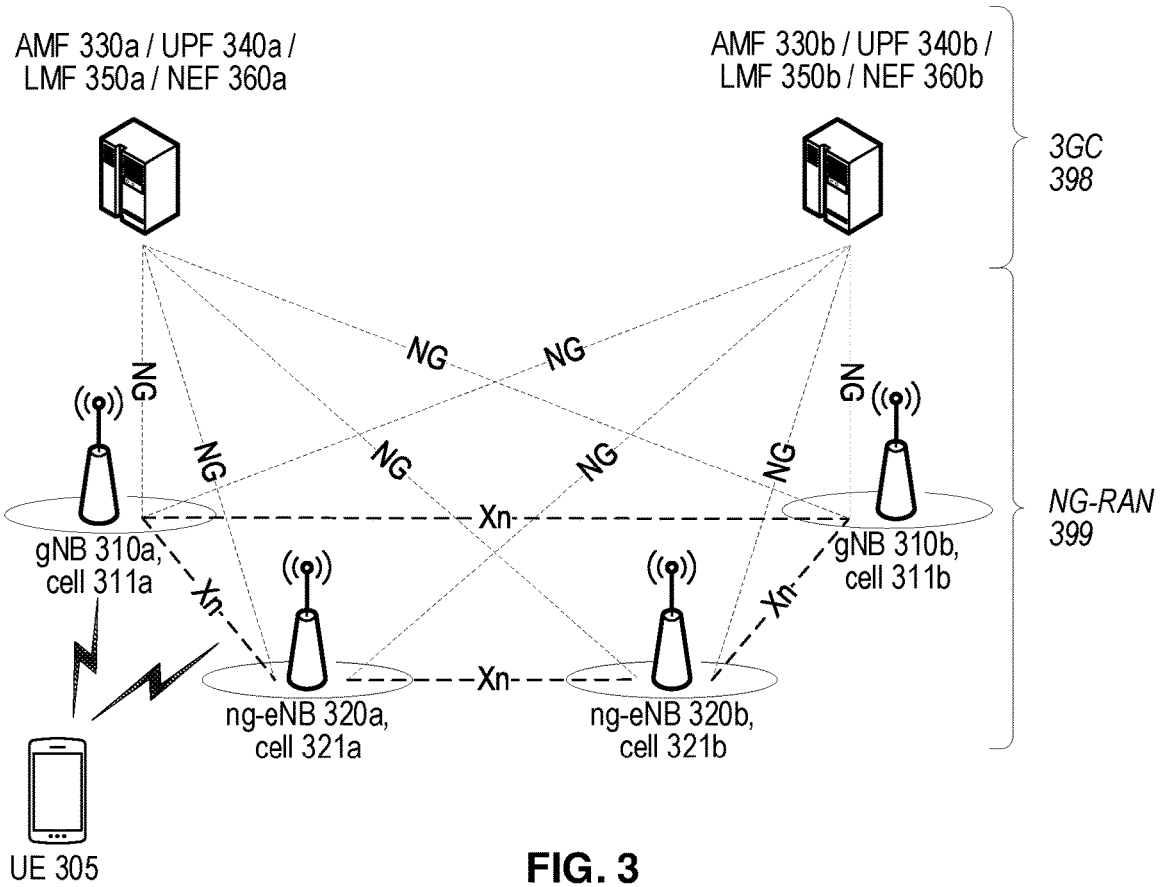

FIG. 3 shows another high-level view of an exemplary 5G network architecture, including NG-RAN 399 and a 5GC 398. As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 3GC 398, more specifically to the AMF (Access and Mobility Management Function) 330 (e.g., AMFs 330a, b) via respective NG-C interfaces and to the UPF (User Plane Function) 340 (e.g., UPFs 340a,b) via respective NG-U interfaces. Moreover, the AMFs 320a,b can communicate with one or more location management functions (LMFs, e.g., LMFs 350a,b) and network exposure functions (NEFs, e.g., NEFs 360a,b). The AMFs, UPFs, LMFs, and NEFs are described in more detail below.

Each of the gNBs 310 can support the NR radio interface including frequency division duplexing (FDD), time division duplexing (TDD), or a combination thereof. In contrast, each of ng-eNBs 320 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 311a-b and 321a-b shown as exemplary in FIG. 3. As mentioned above, the gNBs and ng-eNBs can also use various directional beams to provide coverage in the respective cells. Depending on the particular cell in which it is located, a UE 305 can communicate with the gNB or ng-eNB serving that particular cell via the NR or LTE radio interface, respectively.

Each of the gNBs 310 may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. To access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

Figure 4:
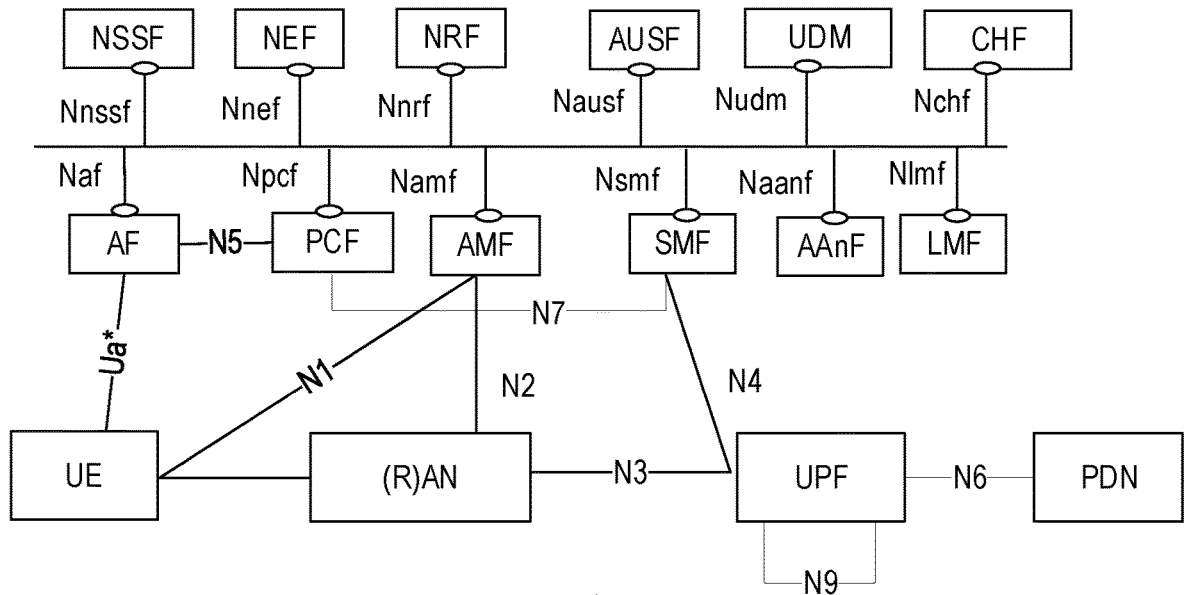
FIG. 4 shows an exemplary non-roaming 5G reference architecture with service-based interfaces and various 3GPP-defined network functions (NFs).

FIG. 4 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e. signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)—supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g. bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g. compute, storage, communication) that provide the capabilities and characteristics of the network slice.

The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Figure 5:
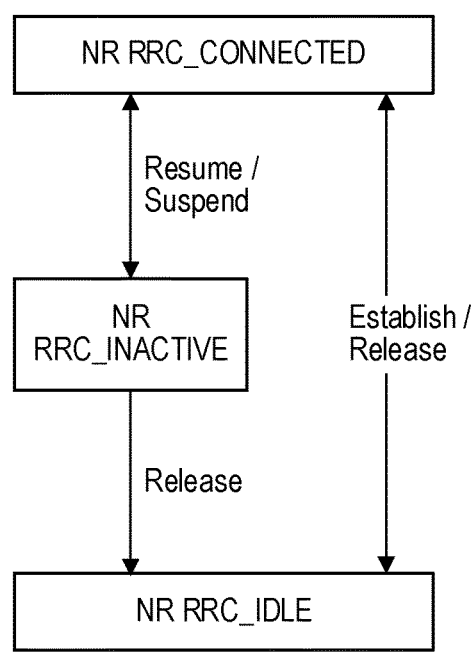
FIG. 5 shows NR/5G radio resource control (RRC) states and procedures by which a UE transitions between these RRC states.

As briefly mentioned above, the NR RRC layer includes the same RRC_IDLE and RRC_CONNECTED states as LTE, but adds an additional state known as RRC_INACTIVE that has some properties similar to the "suspended" condition for LTE. FIG. 5 shows NR RRC states and procedures by which a UE transitions between those states. The properties of the NR RRC states shown in FIG. 5 can be summarized as follows:

RRC_IDLE:
Entered by Release procedure from RRC_INACTIVE or RRC_CONNECTED.
A UE-specific DRX may be configured by upper layers.
UE controlled mobility based on network configuration.
The UE:
  Monitors a Paging channel for CN paging using 5G-S-TMSI;
  Performs neighbor cell measurements and cell (re-) selection; and
  Acquires system information.
RRC_INACTIVE:
Entered by Suspend procedure from RRC_CONNECTED.
A UE specific DRX may be configured by upper layers or by RRC layer.
UE controlled mobility based on network configuration.
The UE stores the AS context.
The UE:
  Monitors a Paging channel for CN paging using 5G-S-TMSI and RAN paging using I-RNTI;
  Performs neighbor cell measurements and cell (re-) selection;
  Performs RAN-based notification area updates periodically and when moving outside the RAN-based notification area;
  Acquires system information.
RRC_CONNECTED:
Entered by Establishment (from RRC_IDLE) or Resume (from RRC_INACTIVE).
The UE stores the AS context.
Transfer of unicast data to/from UE.
At lower layers, the UE may be configured with a UE specific DRX.;
For UEs supporting CA, use of one or more SCells, aggregated with the SpCell, for increased bandwidth;
For UEs supporting DC, use of one SCG, aggregated with the MCG, for increased bandwidth;
Network controlled mobility, i.e. handover within NR and to/from E-UTRAN.
The UE:
  Monitors a Paging channel;
  Monitors control channels associated with the shared data channel to determine if data is scheduled for it;
  Provides channel quality and feedback information;
  Performs neighbor cell measurements and measurement reporting;
  Acquires system information.

Figure 6:
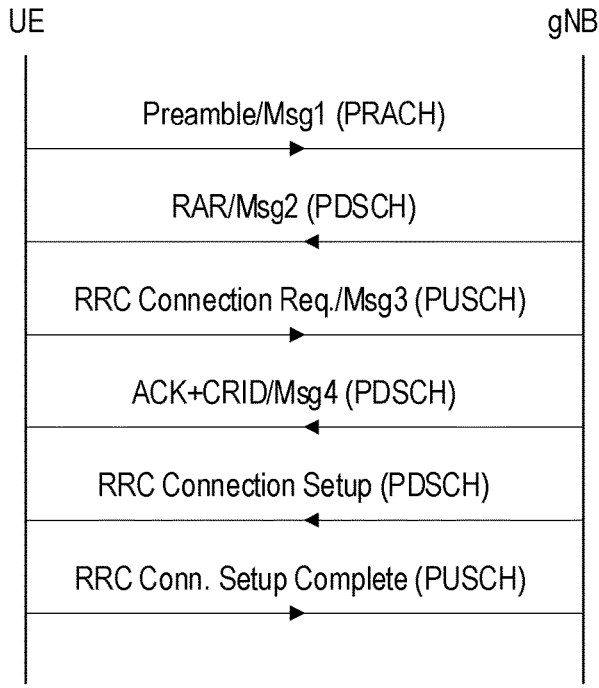
FIG. 6 shows a signal flow diagram of an exemplary successful initial access procedure between a UE and an NR gNB.

During transition from RRC_IDLE to RRC_CONNECTED, as UE performs a random access (also referred to as "initial access") procedure towards the cell in which the UE is currently camping. FIG. 6 shows a signal flow diagram of an exemplary successful initial access procedure between a UE and an NR gNB. The physical random access channel (PRACH) is used by the UE to transmit a random-access (RA) preamble(s) during an initial access procedure towards a cell, and to assist the network (i.e., the NR gNB serving the cell) to adjust the uplink timing of the UE. Like in LTE, Zadoff-Chu (ZC) sequences are used for generating NR RA preambles due to their favorable properties, including constant amplitude before and after DFT operation, zero cyclic autocorrelation, and low cross-correlation.

If the initial transmission of the RA preamble (also referred to as "Msg1") is successfully received, the gNB replies with a random-access response (RAR) message (also referred to as "Msg2") sent via the PDSCH. Msg3 includes a grant of UL (e.g., PUSCH) resources for sending a response. If the UE successfully receives the RAR, it replies with an RRC Connection Request message (also referred to as "Msg3") using the granted PUSCH resources. If the gNB successfully receives Msg3, it responds with an acknowledgement and a contention-resolution identifier (CRID) (collectively referred to as "Msg4") to be used by the UE. In addition, the gNB also sends an RRC Connection Setup message to the UE. Subsequently, the UE responses with an RRC Connection Setup Complete message, which indicates that the UE has successfully established an RRC connection to be used for transmitting and receiving other signaling messages.

The RRC parameter si-BroadcastStatus indicates whether a SIB is currently being broadcast, e.g., via an enumerated {broadcasting, notBroadcasting} data type. In either case, a UE first obtains the SI scheduling information for the SIB from SIB1 transmitted by the network. If the SIB is indicated as broadcasting, the UE can then directly acquire the SIB based on the SI scheduling information. However, if the SIB is indicated as notBroadcasting, the UE first needs to perform the on-demand SI request procedure to initiate the transmission of the SIB (according to the SI scheduling information).

In the above-described random-access procedure, the UE can request on-demand SIBs during transmission of Msg1 and/or Msg3. In response to a successful request associated with one or more SIBs, the network (e.g., the gNB serving the cell) will broadcast the requested SIB(s) for some duration in the cell.

Work is ongoing in 3GPP to introduce support for on-demand delivery of system information via a unicast delivery mechanism, such as an on-demand request while in RRC_CONNECTED state followed by dedicated signaling of the requested SIBs. In case the UE is in RRC_IDLE or RRC_INACTIVE states, the UE would have to perform a procedure to establish a connection, such as the above-described random-access procedure. Once a connection is established and UE is in RRC_CONNECTED state, the UE can send an on-demand SI request message and receive a responsive unicast (e.g., dedicated) RRC message containing the requested SIB(s). In such case, the network can improve efficiency and/or reliability of unicast SI transmission by use of mechanisms available in RRC_CONNECTED state (e.g., HARQ, beam forming etc.).

In general, due to its constant overhead, broadcast is more suitable when there are many users interested in the same content during the same period of time. When there are only a few UEs interested in acquiring the content during the same period, unicast is generally more suitable. Even so, there are drawbacks and/or issues associated with on-demand SI via unicast. For example, if a SIB is only provided on-demand through unicast signaling, a UE in RRC_IDLE or RRC_INACTIVE state would need to enter RRC_CONNECTED state in order to request and then receive the SIB. This will lead to a high resource usage, especially in case many UEs need to acquire the SIB and/or if there are frequent updates to the SIB content.

In addition, a UE can make an on-demand request for several SIBs at one time. In such case, more bandwidth would be needed to deliver these multiple requested SIBs in a timely manner. However, the unicast delivery mechanism in RRC_CONNECTED mode is via control plane (CP) signaling radio bearer (SRB), which has much lower bandwidth compared to user plane (UP) data radio bearers (DRBs).

Furthermore, some SIB contents can vary quickly and UEs needing such information have to (re)acquire it frequently. In such case, there may be very frequent on-demand requests from those UEs. One example is real-time kinematic (RTK) information that is useful for highly accurate global navigation satellite system (GNSS) positioning of UEs.

Support for RTK GNSS positioning was introduced in Rel-15, including both UE-based and UE-assisted GNSS RTK positioning. In UE-assisted positioning techniques, a UE performs measurements and provides them to a location server/network node (e.g., E-SMLC) that calculates the UE position. In UE-based positioning techniques, the UE obtains assistance data from the location server/network node to support position calculation in the UE based on those measurements.

In UE-based GNSS RTK positioning, assistance data can be generated based on observations from one or more reference stations. In general, a "reference station" can refer to a node with known position and known antenna configuration, and also having a GNSS receiver capable of measuring signals from one or more satellite systems. Each GNSS can comprises one or more satellites, with each satellite transmitting one or more signals in one or more frequency bands. Exemplary GNSS include GPS, Galileo, GLONASS, BeiDou, etc.

Figure 7:
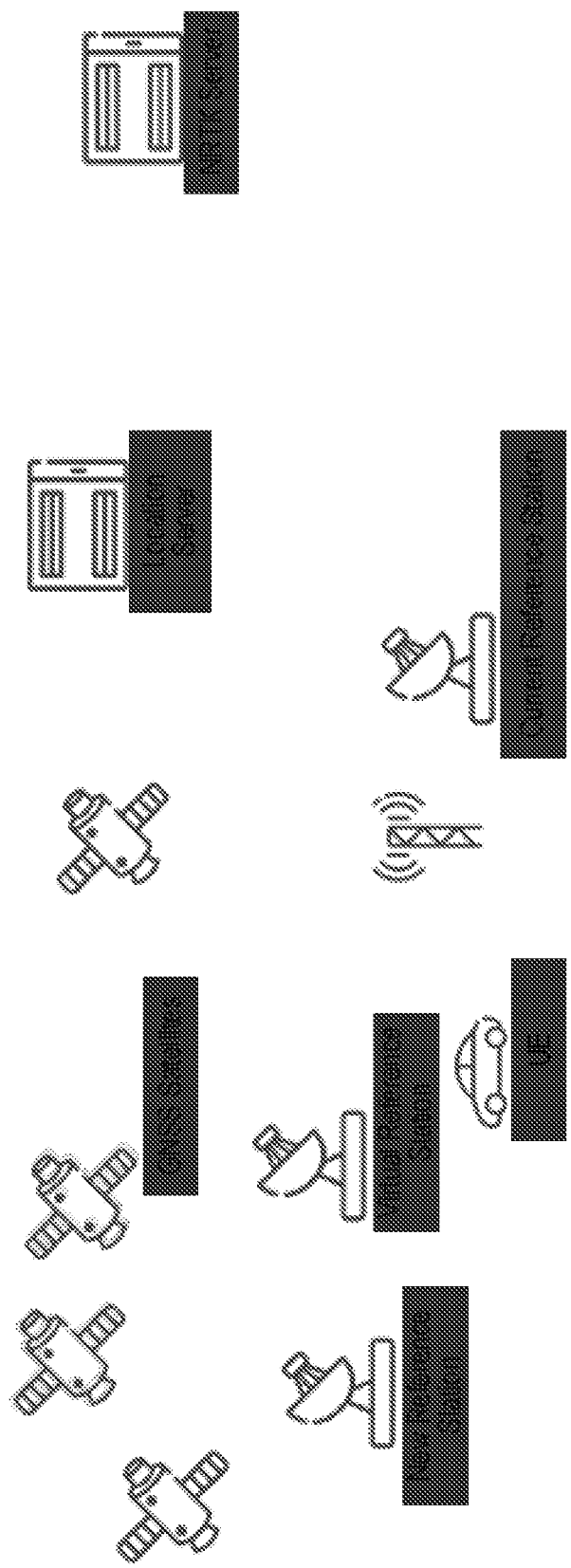
FIG. 7 illustrates an exemplary reference station network usable for UE positioning via global navigation satellite systems (GNSS, e.g., GPS, Galileo, etc.).

A reference station network can gather a plurality of reference station observations of various GNSS satellite signals and can interpolate these observations to generate calculated observations at locations other than actual ("physical") reference station positions. These locations can be referred to as "non-physical" or "virtual" reference stations. FIG. 7 illustrates an exemplary reference station network usable for UE positioning. In this manner, the served UEs obtain observations from one or more physical and/or virtual reference stations, which it can use for positioning itself together with its own GNSS satellite measurements. Gathering reference-station observations, calculating non-physical reference-station observations, and providing this information to UEs can be performed by a server, such as a network RTK (NRTK) server. Such functionality can also be part of a positioning node or positioning server in a 3GPP network, such as E-SMLC in LTE or a location management function (LMF) in a 5G/NR network.

In view of the above issues, drawbacks, and/or problems related to unicast on-demand delivery of SIBs, there is a need to limit UE on-demand SI requests and to systematically determine whether delivery for individual requests will be via unicast or broadcast mechanism. For example, this need is important for GNSS RTK positioning assistance data, which includes several types information that vary quickly and, as such, could result in frequent on-demand SI requests for UEs utilizing this information.

Exemplary embodiments of the present disclosure address these and other problems, issues, and/or difficulties by a novel mechanism that can prevent UE misuse of on-demand SI requests and can facilitate efficient use of limited CP bandwidth. At a high level, the network (e.g., a network node providing a cell serving one or more UEs) determines for each UE one or more restrictions such as a maximum number of on-demand SIB requests and/or a maximum request rate per unit time, and provides such information to the respective UEs. Furthermore, in case of congested RACH resources and/or some level of failure in RACH attempts in the cell, the network can provide the UE(s) with a wait time for on-demand requests while in RRC_IDLE or RRC_INACTIVE state. Also, in case of congested SRB resources, the network can provide the UE(s) with a wait time and/or a prohibit timer for on-demand requests while in RRC_CONNECTED state. In general, the network can enable, disable, and/or regulate the on-demand SI request functionality based on the prevailing resource conditions in the cell, targeting particular UEs or all UEs operating in the cell. Upon receiving such information, UEs can then perform on-demand SI requests in accordance with the received restriction information (e.g., maximum number, maximum request rate, wait time, and/or prohibit timer).

Exemplary embodiments can provide various advantages and/or advantages, including addressing various issues, difficulties, and/or problems. For example, embodiments allow the network to protect and/or prioritize RACH procedures for establishment of data connections rather than for on-demand SI requests. As another example, embodiments allow the network to protect and/or prioritize SRB usage for essential RRC operations (e.g., reconfigurations for UE mobility) rather than for on-demand delivery of SIBs. As another example, such embodiments allow the network to control the request rate and amount of SI delivery. More generally, such embodiments provide mechanisms for the network to control the utilization of its resources in an efficient manner, including RACH resources that are scarce and used for all cases where UE has to initiate connection with the network.

In some embodiments, based upon the RACH load, the network prioritizes or restricts the usage of RACH resource for certain types of operations by UEs, including on-demand SI requests.

In some embodiments, the network can utilize a timer to restrict a UE from making a new on-demand SI request for certain duration after making a previous on-demand SI request. For example, this can be a "wait timer" associated with a "wait time" value. In some embodiments, the restricted duration (e.g., determined by the timer) may be common for all UEs and/or for all requested SIBs.

In other embodiments, the restricted duration can be implicit based on the validity duration of the SIB (e.g., its contents), and/or upon the broadcast control channel (BCCH) modification (e.g., update) period. Furthermore, the network can provide an explicit timer value based on a multiple of SI update period and/or rate. For example, the network can instruct a UE to perform the SI request no more frequently than every second update period. In such case, if a SIB is updated every two (2) seconds, the UE can request the SIB at four-second intervals (e.g., at 2 s, 6 s, 10 s, etc.) but refrain from requesting the SIB for intervening updates (e.g., at 4 s, 8 s, 12 s, etc.).

In some embodiments, the network can include a value for the timer restricting on-demand SI request for RRC_CONNECTED UEs in broadcast SIB1, such that the timer value is the same for all UEs that receive SIB1. In other embodiments, the network can include a value for the timer restricting on-demand SI request for RRC_CONNECTED UEs in each specific SIB that may be requested on-demand. In other embodiments, the network can include a value for the timer restricting on-demand SI request for RRC_CONNECTED UEs in dedicated RRC messages, e.g., RRCReconfiguration, RRCSetup, or RRCResume.

In various embodiments, a UE can receive a wait time both in the active mode or idle mode procedure. The wait time value can be given as a set of values (e.g., in seconds or ms) for the UE to use to set a timer, or it can be given in terms of number of scheduling request (SR) periods. In other embodiments, the UE can receive a prohibit timer, e.g., in terms of number of SR periods. The UE can start this timer after transmitting a request, and when the timer is running, the UE is prohibited from sending any further on-demand SI requests.

In various embodiments, some of the SIB contents may be large in size, e.g., occupying the maximum allowed SI size. Alternately, the SIB contents can be broken into multiple segments. In some embodiments, the segment (or sequence) number can be included in each SIB that is broadcast (i.e., in each SIB sent to the UE via broadcast) or sent to the UE via dedicated RRC signalling (e.g., RRCReconfiguration). The network can determine, based on the prevailing resource condition and load on the SRB, how many SIBs or segments the UE can request. The number can be the same or different for broadcast or unicast SI delivery mechanisms. In addition, the number can be dependent upon packet data convergence protocol (PDCP) layer size limitations, such that UEs limit the total size of the requested SIBs to be less than the PDCP layer size limitation.

In some embodiments, the maximum number of SIBs that a UE can request on-demand can be configurable, e.g., by an RRC message sent to the UE by the network. In such case, a UE would comply with this limit when requesting SIBs on-demand. In some embodiments, this restriction can be linked to a particular duration or time frame, e.g., a maximum of X SIBs every Y seconds. In some embodiments, rather than a maximum number of SIBs, the restriction can be in terms of a total aggregated size of requested SIBs (e.g., in terms of bytes or octets). Such a size-based restriction can also be linked to a particular duration or time frame. In case the restriction is the same for all UEs operating in a cell, the particular value(s) defining the restriction can be broadcast by the network.

In some embodiments, the network can enable or disable on-demand SI requests for some or all UEs operating in RRC_CONNECTED state within a cell. This can be done, for example, using an RRC Reconfiguration procedure in which the network transmits RRCReconfiguration messages to the respective UEs. In various embodiments, criteria for enabling/disabling can depend upon UE QoS requirements (e.g., location accuracy and latency for UE positioning), which the UE can provide to the network. For example, QoS requirements could be identified by an integer 1 to 5, with "1"=accuracy<1 m and latency<1 s, "5"=accuracy<50 m and latency>5 s, and other values identifying intermediate requirements. The UE can inform the network of its QoS requirements, or the network can retrieve a QoS associated with a UE subscription. Enabling or disabling on-demand SI requests for some or all UEs operating in RRC_CONNECTED state within a cell can also be based on SRB load and the number of request a particular UE has been making.

With respect to UE positioning-related embodiments, the SIBs requested on-demand can include various positioning assistance data, such as RTK information discussed above. If the network informs the UE of a wait time that the UE determines to be too long (e.g., to meet its QoS requirements), the UE can send a request to another network node (e.g., a location server or LMF) to receive the required assistance data via unicast (e.g., via LPP messages).

Moreover, some of the positioning assistance data provided in SIBs can be categorized as fast-changing, such that the content may be different for every update period. In such case, these SIBs will not be associated with a valueTag or expiration Time fields that are currently defined in 3GPP TS 36.355 (v15.4.0). The above embodiments are particularly suited for these types of SIBs, or other SIBs that have short validity duration.

FIG. 8 shows an ASN.1 data structure for an exemplary SIB for scheduling information pertaining to positioning-related SI (e.g., assistance data), according to various exemplary embodiments of the present disclosure. This exemplary SIB is named "SIBXX-Pos-R16" and includes various information elements (IEs) that can be used to control on-demand SI requests by UEs, including:

posSI-RequestRate—indicates how frequently a UE can request certain SIB. This field is mainly applicable for fast changing SIBs which do not have any validity duration. Value t1 implies during every update rate, t2 implies every other alternate update period and so on.

posSI-RequestWaitDuration—indicates the UE shall wait for certain duration after making the first request. In this example, it is shown as common for all SIBs; however, it is possible to specify this parameter per SIB.

posSI-NumberOfSIRequest—indicates how many SIBs the UE is allowed to request in one attempt.

posSI-SegmentNumber—indicates the sequence number in case a SIB is segmented.

Figure 9:
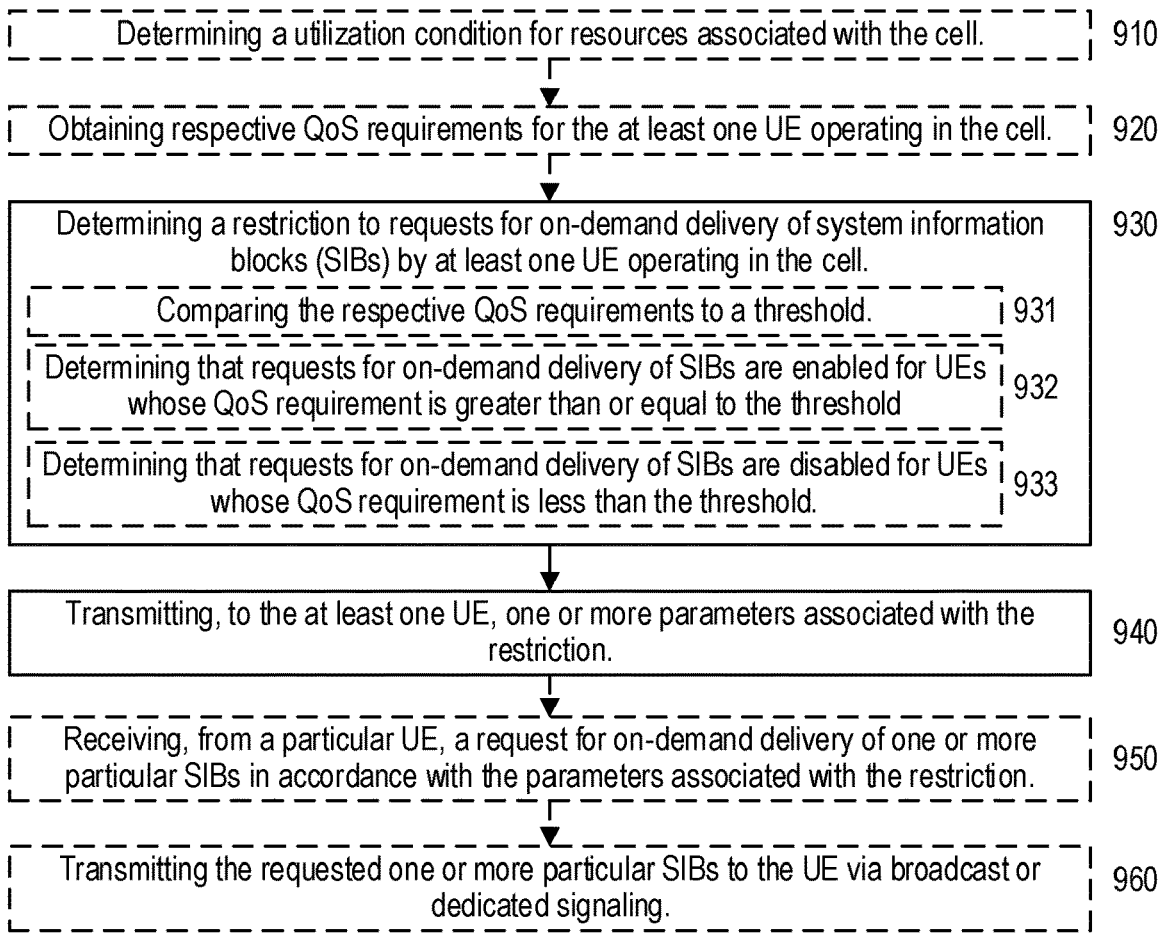
FIG. 9 shows an exemplary method (e.g., procedure) for a network node (e.g., base station, eNB, gNB, ng-eNB, etc. or component thereof), according to various exemplary embodiments of the present disclosure.
Figure 10:
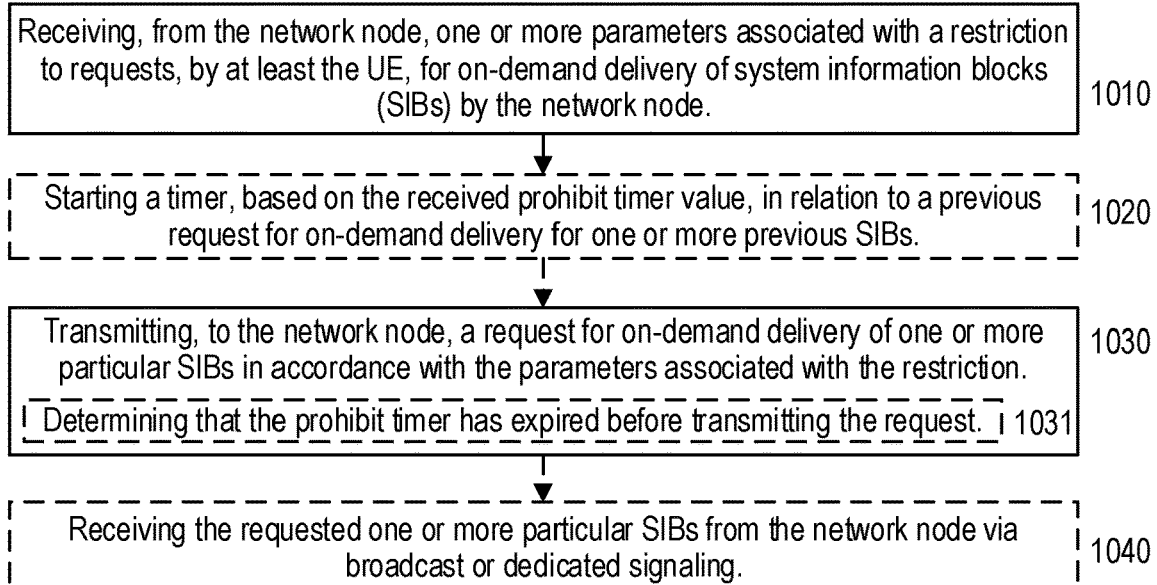
FIG. 10 shows an exemplary method (e.g., procedure) for a user equipment (UE, e.g., wireless device), according to various exemplary embodiments of the present disclosure.

These embodiments described above can be further illustrated with reference to FIGS. 9-10, which depict exemplary methods (e.g., procedures) for a network node and a UE, respectively. In other words, various features of the operations described below with reference to FIGS. 9-10 correspond to various embodiments described above. The exemplary methods shown in FIGS. 9-10 can be used cooperatively to provide various benefits, advantages, and/or solutions to problems described herein. Although the exemplary methods are illustrated in FIGS. 9-10 by specific blocks in particular orders, the operations corresponding to the blocks can be performed in different orders than shown and can be combined and/or divided into blocks having different functionality than shown. Optional blocks or operations are indicated by dashed lines.

More specifically, FIG. 9 illustrates an exemplary method (e.g., procedure) for a network node, of a radio access network (RAN), that provides a cell serving one or more user equipment (UEs), in accordance with various embodiments of the present disclosure. The exemplary method can be performed by a network node (e.g., base station, gNB, eNB, ng-eNB, etc. or component thereof) configured and/or arranged as described in relation to other figures herein.

The exemplary method can include the operations of block 930, where the network node can determine a restriction to requests for on-demand delivery of system information blocks (SIBs) by at least one UE operating in the cell. The exemplary method can also include the operations of block 940, where the network node can transmit, to the at least one UE, one or more parameters associated with the restriction.

In some embodiments, the one or more parameters can include any of the following:
 a prohibit timer value that indicates a duration, after a UE requests on-demand delivery of one or more SIBs, until the UE can request on-demand delivery of one or more further SIBs; and
 a maximum number of SIBs or SIB segments that a UE can request for on-demand delivery.

In some embodiments, the restriction comprises enabling or disabling requests for on-demand delivery of SIBs individually for each of the at least one UE.

In some embodiments, the restriction can be for requests for on-demand delivery of SIBs during UE operation in RRC_CONNECTED state. In such embodiments, the one or more parameters are transmitted (e.g., in block 940) in respective RRCReconfiguration messages to the at least one UE. In some of these embodiments, transmitting the one or more parameters in an RRCReconfiguration message to a particular UE can indicate that requests for on-demand delivery of SIB are enabled for the particular UE.

In some embodiments, SIBs available for on-demand delivery can include global navigation satellite system (GNSS) positioning assistance information. In such embodiments, determining the restriction (e.g., in block 930) can be based on a duration between updates of real-time kinematic (RTK) information comprising the GNSS positioning assistance information.

In some embodiments, the exemplary method can also include the operations of block 910, where the network node can determine a utilization condition for resources associated with the cell. In such embodiments, the restriction can be determined (e.g., in block 930) based on the utilization condition determined in block 910. For example, the utilization condition can be for signaling radio bearer (SRB) resources or random-access channel (RACH) resources.

In other embodiments, the exemplary method can also include the operations of block 920, where the network node can obtain respective QoS requirements for the at least one UE. In such embodiments, the restriction for the at least one UE (e.g., determined in block 930) comprises respective restrictions based on the respective QoS requirements. For example, each UE's restriction requirement can be based on that UE's QoS requirement.

In some of these embodiments, determining the restriction in block 930 can include the operations of sub-blocks 931-933. In sub-block 931, the network node can compare the respective QoS requirements (i.e., for the respective UEs) to a threshold. In sub-block 932, the network node can determine that requests for on-demand delivery of SIBs are enabled for UEs whose QoS requirement is greater than or equal to the threshold. In sub-block 933, the network node can determine that requests for on-demand delivery of SIBs are disabled for UEs whose QoS requirement is less than the threshold.

In some embodiments, the exemplary method can also include the operations of blocks 950-960. In block 950, the network node can receive, from a particular UE, a request for on-demand delivery of one or more particular SIBs in accordance with the parameters associated with the restriction. In sub-block 960, the network node can transmit the requested one or more particular SIBs to the UE via broadcast or dedicated signaling. In some embodiments, the one or more particular SIBs can include global navigation satellite system (GNSS) positioning assistance information.

In addition, FIG. 10 illustrates an exemplary method (e.g., procedure) for a user equipment (UE) operating in a cell provided by a network node in a radio access network (RAN), in accordance with various embodiments of the present disclosure. The exemplary method can be performed by a UE (e.g., wireless device) configured and/or arranged as described in relation to other figures herein.

The exemplary method can include the operations of block 1010, where the UE can receive, from the network node, one or more parameters associated with a restriction to requests, by at least the UE, for on-demand delivery of system information blocks (SIBs) by the network node. The exemplary method can also include the operations of block 1030, where the UE can transmit, to the network node, a request for on-demand delivery of one or more particular SIBs in accordance with the parameters associated with the restriction. In some embodiments, the exemplary method can also include the operations of block 1040, where the UE can receive the requested one or more particular SIBs from the network node via broadcast or dedicated signaling.

In some embodiments, the one or more parameters can include any of the following:
 a prohibit timer value that indicates a duration, after a UE requests on-demand delivery of one or more SIBs, until the UE can request on-demand delivery of one or more further SIBs; and
 a maximum number of SIBs or SIB segments that a UE can request for on-demand delivery.

In some of these embodiments, the exemplary method can also include the operations of block 1020, where the UE can start a timer, based on the received prohibit timer value, in relation to a previous request for on-demand delivery for one or more previous SIBs. In such embodiments, transmitting the request in accordance with the parameters (e.g., in block 1030) can include the operations of sub-block 1031, where the UE can determine that the prohibit timer has expired before transmitting the request. Furthermore, in some of these embodiments, the one or more particular SIBs (e.g., requested in block 1030) comprise a plurality of SIBs or SIB segments less than or equal to the maximum number (e.g., received in block 1010).

In some embodiments, the restriction can be for requests for on-demand delivery of SIBs during UE operation in RRC_CONNECTED state. In such embodiments, the one or more parameters can be received (e.g., in block 1010) in an RRCReconfiguration message. In some of these embodiments, transmitting the request (e.g., in block 1030) can be based on an indication that requests for on-demand delivery of SIBs are enabled for the UE. This indication can be based on receiving the one or more parameters in the RRCReconfiguration message. In other words, receiving an RRCReconfiguration message with the parameters can indicate that requests for on-demand delivery are enabled for the UE.

In some embodiments, the one or more particular SIBs (e.g., requested in block 1030) can include global navigation satellite system (GNSS) positioning assistance information. In such embodiments, the request for on-demand delivery of the one or more particular SIBs can be transmitted in response to initiating a GNSS positioning procedure. In some of these embodiments, the restriction can be related to a duration between updates of real-time kinematic (RTK) information comprising the GNSS positioning assistance information.

In some embodiments, the UE can be operating in RRC_CONNECTED state with a QoS requirement and the restriction can be based on the UE's QoS requirement.

Figure 11:
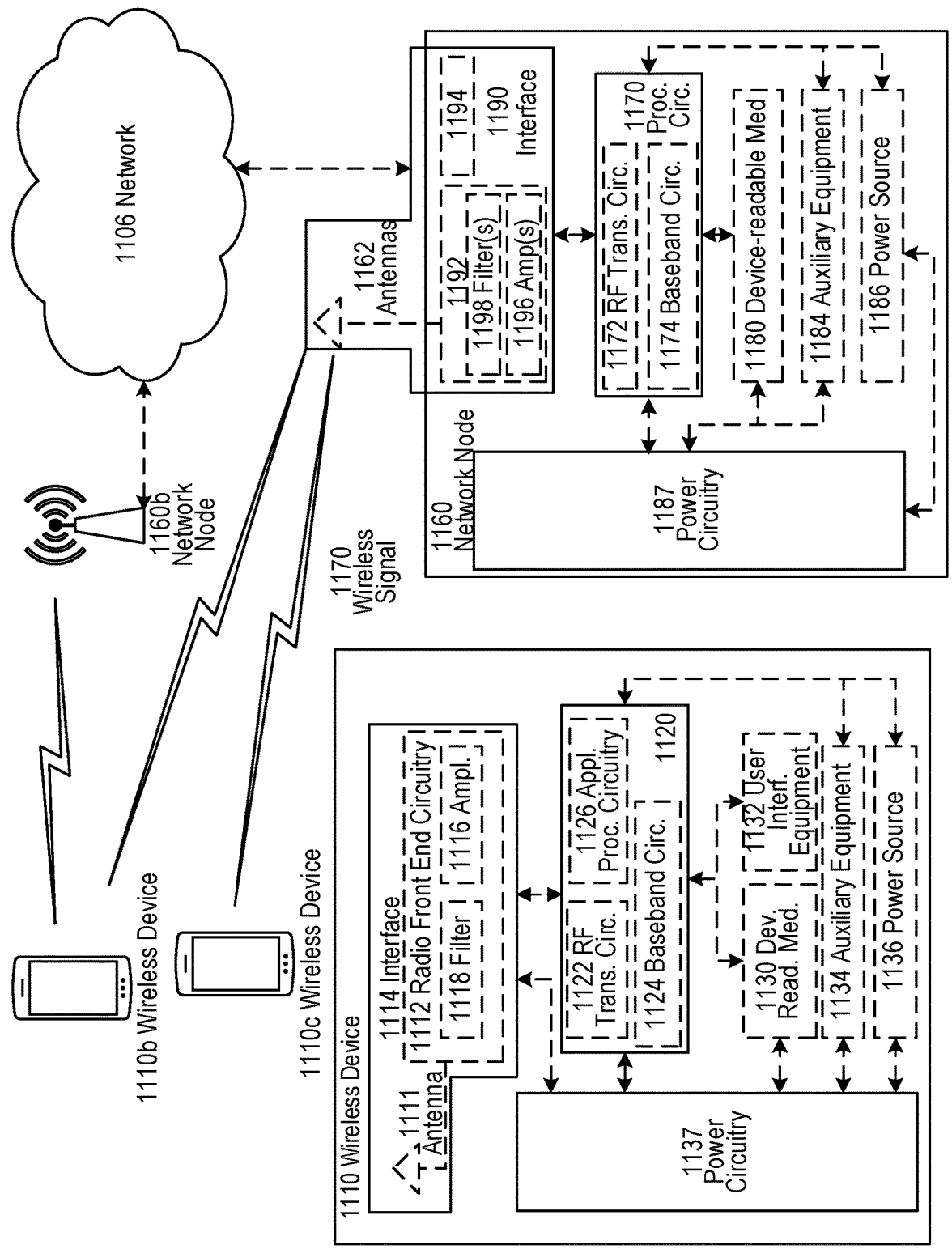
FIG. 11 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network can further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 can represent a device that includes the illustrated combination of hardware components, other embodiments can comprise network nodes with different combinations of components. It is to be understood that a network node comprises any suitable combination of hardware and/or software needed to perform the tasks, features, functions, methods, and/or procedures disclosed herein. Moreover, while the components of network node 1160 are depicted as single boxes located within a larger box, or nested within multiple boxes, in practice, a network node can comprise multiple different physical components that make up a single illustrated component (e.g., device readable medium 1180 can comprise multiple separate hard drives as well as multiple RAM modules).

Similarly, network node 1160 can be composed of multiple physically separate components (e.g., a NodeB component and an RNC component, or a BTS component and a BSC component, etc.), which can each have their own respective components. In certain scenarios in which network node 1160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1160 can be configured to support multiple radio access technologies (RATs). In such embodiments, some components can be duplicated (e.g., separate device readable medium 1180 for the different RATs) and some components can be reused (e.g., the same antenna 1162 can be shared by the RATs). Network node 1160 can also include multiple sets of the various illustrated components for different wireless technologies integrated into network node 1160, such as, for example, GSM, WCDMA, LTE, NR, WiFi, or Bluetooth wireless technologies. These wireless technologies can be integrated into the same or different chip or set of chips and other components within network node 1160.

Processing circuitry 1170 can be configured to perform any determining, calculating, or similar operations (e.g., certain obtaining operations) described herein as being provided by a network node. These operations performed by processing circuitry 1170 can include processing information obtained by processing circuitry 1170 by, for example, converting the obtained to information into other information, comparing the obtained information or converted information to information stored in the network node, and/or performing one or more operations based on the obtained information or converted information, and as a result of said processing making a determination.

Processing circuitry 1170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1160, either alone or in conjunction with other network node 1160 components (e.g., device readable medium 1180). Such functionality can include any of the various wireless features, functions, or benefits discussed herein.

For example, processing circuitry 1170 can execute instructions stored in device readable medium 1180 or in memory within processing circuitry 1170. In some embodiments, processing circuitry 1170 can include a system on a chip (SOC). As a more specific example, instructions (also referred to as a computer program product) stored in medium 1180 can include instructions that, when executed by processing circuitry 1170, can configure network node 1160 to perform operations corresponding to various exemplary methods (e.g., procedures) described herein.

In some embodiments, processing circuitry 1170 can include one or more of radio frequency (RF) transceiver circuitry 1172 and baseband processing circuitry 1174. In some embodiments, radio frequency (RF) transceiver circuitry 1172 and baseband processing circuitry 1174 can be on separate chips (or sets of chips), boards, or units, such as radio units and digital units. In alternative embodiments, part or all of RF transceiver circuitry 1172 and baseband processing circuitry 1174 can be on the same chip or set of chips, boards, or units In certain embodiments, some or all of the functionality described herein as being provided by a network node, base station, eNB or other such network device can be performed by processing circuitry 1170 executing instructions stored on device readable medium 1180 or memory within processing circuitry 1170. In alternative embodiments, some or all of the functionality can be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160 but are enjoyed by network node 1160 as a whole, and/or by end users and the wireless network generally.

Device readable medium 1180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1170. Device readable medium 1180 can store any suitable instructions, data or information, including a computer program, software, an application including one or more of logic, rules, code, tables, etc. and/or other instructions capable of being executed by processing circuitry 1170 and, utilized by network node 1160. Device readable medium 1180 can be used to store any calculations made by processing circuitry 1170 and/or any data received via interface 1190. In some embodiments, processing circuitry 1170 and device readable medium 1180 can be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that can be coupled to, or in certain embodiments a part of, antenna 1162. Radio front end circuitry 1192 comprises filters 1198 and amplifiers 1196. Radio front end circuitry 1192 can be connected to antenna 1162 and processing circuitry 1170. Radio front end circuitry can be configured to condition signals communicated between antenna 1162 and processing circuitry 1170. Radio front end circuitry 1192 can receive digital data that is to be sent out to other network nodes or WDs via a wireless connection. Radio front end circuitry 1192 can convert the digital data into a radio signal having the appropriate channel and bandwidth parameters using a combination of filters 1198 and/or amplifiers 1196. The radio signal can then be transmitted via antenna 1162. Similarly, when receiving data, antenna 1162 can collect radio signals which are then converted into digital data by radio front end circuitry 1192. The digital data can be passed to processing circuitry 1170. In other embodiments, the interface can comprise different components and/or different combinations of components.

In certain alternative embodiments, network node 1160 may not include separate radio front end circuitry 1192, instead, processing circuitry 1170 can comprise radio front end circuitry and can be connected to antenna 1162 without separate radio front end circuitry 1192. Similarly, in some embodiments, all or some of RF transceiver circuitry 1172 can be considered a part of interface 1190. In still other embodiments, interface 1190 can include one or more ports or terminals 1194, radio front end circuitry 1192, and RF transceiver circuitry 1172, as part of a radio to unit (not shown), and interface 1190 can communicate with baseband processing circuitry 1174, which is part of a digital unit (not shown).

Antenna 1162 can include one or more antennas, or antenna arrays, configured to send and/or receive wireless signals. Antenna 1162 can be coupled to radio front end circuitry 1190 and can be any type of antenna capable of transmitting and receiving data and/or signals wirelessly. In some embodiments, antenna 1162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1162 can be separate from network node 1160 and can be connectable to network node 1160 through an interface or port.

Antenna 1162, interface 1190, and/or processing circuitry 1170 can be configured to perform any receiving operations and/or certain obtaining operations described herein as being performed by a network node. Any information, data and/or signals can be received from a wireless device, another network node and/or any other network equipment. Similarly, antenna 1162, interface 1190, and/or processing circuitry 1170 can be configured to perform any transmitting operations described herein as being performed by a network node. Any information, data and/or signals can be transmitted to a wireless device, another network node and/or any other network equipment.

Power circuitry 1187 can comprise, or be coupled to, power management circuitry and can be configured to supply the components of network node 1160 with power for performing the functionality described herein. Power circuitry 1187 can receive power from power source 1186. Power source 1186 and/or power circuitry 1187 can be configured to provide power to the various components of network node 1160 in a form suitable for the respective components (e.g., at a voltage and current level needed for each respective component). Power source 1186 can either be included in, or external to, power circuitry 1187 and/or network node 1160. For example, network node 1160 can be connectable to an external power source (e.g., an electricity outlet) via an input circuitry or interface such as an electrical cable, whereby the external power source supplies power to power circuitry 1187. As a further example, power source 1186 can comprise a source of power in the form of a battery or battery pack which is connected to, or integrated in, power circuitry 1187. The battery can provide backup power should the external power source fail. Other types of power sources, such as photovoltaic devices, can also be used.

Alternative embodiments of network node 1160 can include additional components beyond those shown in FIG. 11 that can be responsible for providing certain aspects of the network node's functionality, including any of the functionality described herein and/or any functionality necessary to support the subject matter described herein. For example, network node 1160 can include user interface equipment to allow and/or facilitate input of information into network node 1160 and to allow and/or facilitate output of information from network node 1160. This can allow and/or facilitate a user to perform diagnostic, maintenance, repair, and other administrative functions for network node 1160.

In some embodiments, a wireless device (WD, e.g., WD 1110) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 can include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies can be integrated into the same or different chips or set of chips as other components within WD 1110.

Antenna 1111 can include one or more antennas or antenna arrays, configured to send and/or receive wireless signals, and is connected to interface 1114. In certain alternative embodiments, antenna 1111 can be separate from WD 1110 and be connectable to WD 1110 through an interface or port. Antenna 1111, interface 1114, and/or processing circuitry 1120 can be configured to perform any receiving or transmitting operations described herein as being performed by a WD. Any information, data and/or signals can be received from a network node and/or another WD. In some embodiments, radio front end circuitry and/or antenna 1111 can be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120 and can be configured to condition signals communicated between antenna 1111 and processing circuitry 1120. Radio front end circuitry 1112 can be coupled to or a part of antenna 1111. In some embodiments, WD 1110 may not include separate radio front end circuitry 1112; rather, processing circuitry 1120 can comprise radio front end circuitry and can be connected to antenna 1111. Similarly, in some embodiments, some or all of RF transceiver circuitry 1122 can be considered a part of interface 1114. Radio front end circuitry 1112 can receive digital data that is to be sent out to other network nodes or WDs via a wireless connection. Radio front end circuitry 1112 can convert the digital data into a radio signal having the appropriate channel and bandwidth parameters using a combination of filters 1118 and/or amplifiers 1116. The radio signal can then be transmitted via antenna 1111. Similarly, when receiving data, antenna 1111 can collect radio signals which are then converted into digital data by radio front end circuitry 1112. The digital data can be passed to processing circuitry 1120. In other embodiments, the interface can comprise different components and/or different combinations of components.

Processing circuitry 1120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1110 functionality either alone or in combination with other WD 1110 components, such as device readable medium 1130. Such functionality can include any of the various wireless features or benefits discussed herein.

For example, processing circuitry 1120 can execute instructions stored in device readable medium 1130 or in memory within processing circuitry 1120 to provide the functionality disclosed herein. More specifically, instructions (also referred to as a computer program product) stored in medium 1130 can include instructions that, when executed by processor 1120, can configure wireless device 1110 to perform operations corresponding to various exemplary methods (e.g., procedures) described herein.

As illustrated, processing circuitry 1120 includes one or more of RF transceiver circuitry 1122, baseband processing circuitry 1124, and application processing circuitry 1126. In other embodiments, the processing circuitry can comprise different components and/or different combinations of components. In certain embodiments processing circuitry 1120 of WD 1110 can comprise a SOC. In some embodiments, RF transceiver circuitry 1122, baseband processing circuitry 1124, and application processing circuitry 1126 can be on separate chips or sets of chips. In alternative embodiments, part or all of baseband processing circuitry 1124 and application processing circuitry 1126 can be combined into one chip or set of chips, and RF transceiver circuitry 1122 can be on a separate chip or set of chips. In still alternative embodiments, part or all of RF transceiver circuitry 1122 and baseband processing circuitry 1124 can be on the same chip or set of chips, and application processing circuitry 1126 can be on a separate chip or set of chips. In yet other alternative embodiments, part or all of RF transceiver circuitry 1122, baseband processing circuitry 1124, and application processing circuitry 1126 can be combined in the same chip or set of chips. In some embodiments, RF transceiver circuitry 1122 can be a part of interface 1114. RF transceiver circuitry 1122 can condition RF signals for processing circuitry 1120.

In certain embodiments, some or all of the functionality described herein as being performed by a WD can be provided by processing circuitry 1120 executing instructions stored on device readable medium 1130, which in certain embodiments can be a computer-readable storage medium. In alternative embodiments, some or all of the functionality can be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 can be configured to perform any determining, calculating, or similar operations (e.g., certain obtaining operations) described herein as being performed by a WD. These operations, as performed by processing circuitry 1120, can include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 can be operable to store a computer program, software, an application including one or more of logic, rules, code, tables, etc. and/or other instructions capable of being executed by processing circuitry 1120. Device readable medium 1130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1120. In some embodiments, processing circuitry 1120 and device readable medium 1130 can be considered to be integrated.

User interface equipment 1132 can include components that allow and/or facilitate a human user to interact with WD 1110. Such interaction can be of many forms, such as visual, audial, tactile, etc. User interface equipment 1132 can be operable to produce output to the user and to allow and/or facilitate the user to provide input to WD 1110. The type of interaction can vary depending on the type of user interface equipment 1132 installed in WD 1110. For example, if WD 1110 is a smart phone, the interaction can be via a touch screen; if WD 1110 is a smart meter, the interaction can be through a screen that provides usage (e.g., the number of gallons used) or a speaker that provides an audible alert (e.g., if smoke is detected). User interface equipment 1132 can include input interfaces, devices and circuits, and output interfaces, devices and circuits. User interface equipment 1132 can be configured to allow and/or facilitate input of information into WD 1110 and is connected to processing circuitry 1120 to allow and/or facilitate processing circuitry 1120 to process the input information. User interface equipment 1132 can include, for example, a microphone, a proximity or other sensor, keys/buttons, a touch display, one or more cameras, a USB port, or other input circuitry. User interface equipment 1132 is also configured to allow and/or facilitate output of information from WD 1110, and to allow and/or facilitate processing circuitry 1120 to output information from WD 1110. User interface equipment 1132 can include, for example, a speaker, a display, vibrating circuitry, a USB port, a headphone interface, or other output circuitry. Using one or more input and output interfaces, devices, and circuits, of user interface equipment 1132, WD 1110 can communicate with end users and/or the wireless network and allow and/or facilitate them to benefit from the functionality described herein.

Auxiliary equipment 1134 is operable to provide more specific functionality which may not be generally performed by WDs. This can comprise specialized sensors for doing measurements for various purposes, interfaces for additional types of communication such as wired communications etc. The inclusion and type of components of auxiliary equipment 1134 can vary depending on the embodiment and/or scenario.

Power source 1136 can, in some embodiments, be in the form of a battery or battery pack. Other types of power sources, such as an external power source (e.g., an electricity outlet), photovoltaic devices or power cells, can also be used. WD 1110 can further comprise power circuitry 1137 for delivering power from power source 1136 to the various parts of WD 1110 which need power from power source 1136 to carry out any functionality described or indicated herein. Power circuitry 1137 can in certain embodiments comprise power management circuitry. Power circuitry 1137 can additionally or alternatively be operable to receive power from an external power source; in which case WD 1110 can be connectable to the external power source (such as an electricity outlet) via input circuitry or an interface such as an electrical power cable. ower circuitry 1137 can also in certain embodiments be operable to deliver power from an external power source to power source 1136. This can be, for example, for the charging of power source 1136. Power circuitry 1137 can perform any converting or other modification to the power from power source 1136 to make it suitable for supply to the respective components of WD 1110.

Figure 12:
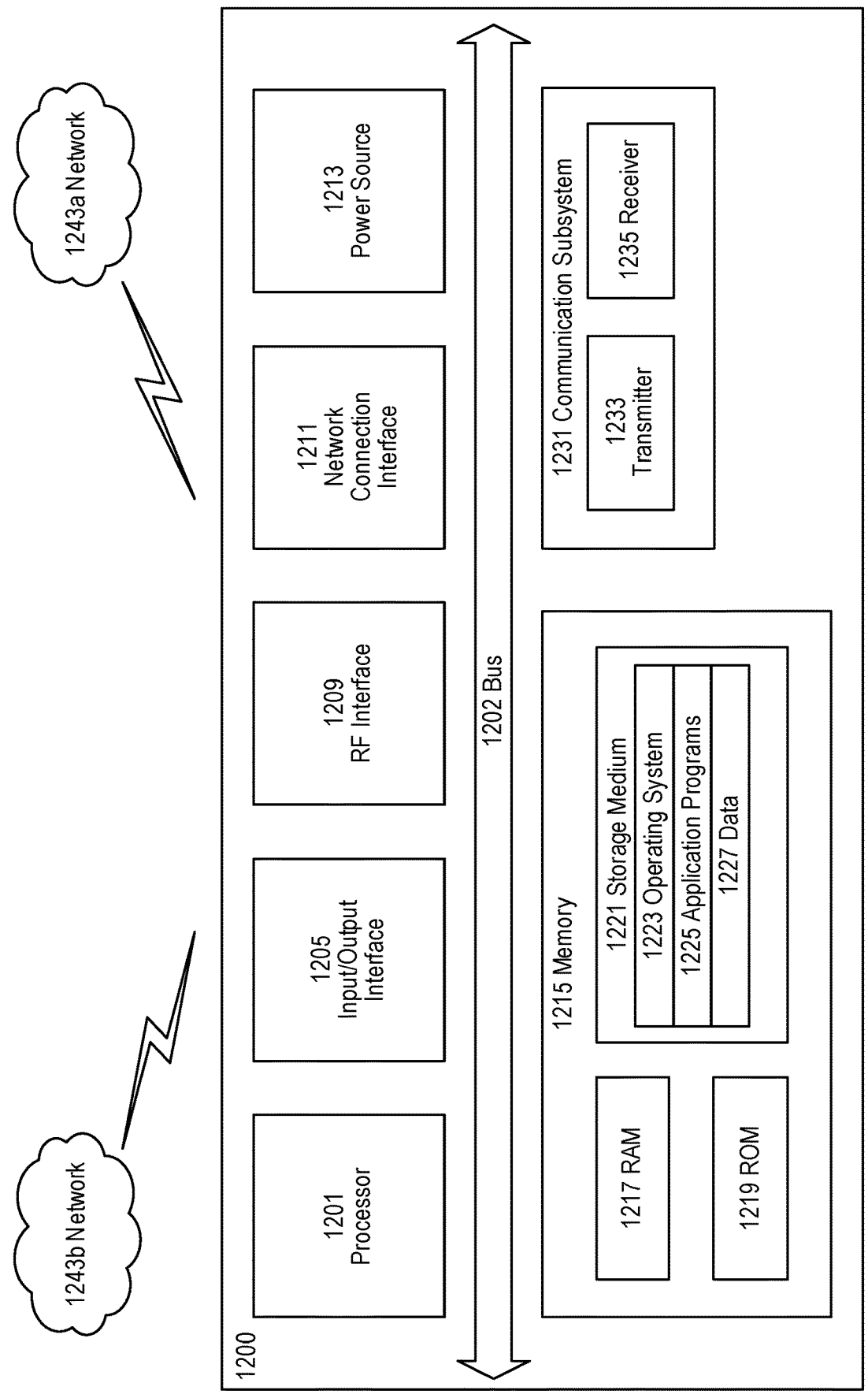
FIG. 12 is a block diagram of an exemplary user equipment (UE) configurable according to various exemplary embodiments of the present disclosure.

FIG. 12 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 12200 can be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 can include other similar types of information. Certain UEs can utilize all of the components shown in FIG. 12, or only a subset of the components. The level of integration between the components can vary from one UE to another UE. Further, certain UEs can contain multiple instances of a component, such as multiple processors, memories, transceivers, transmitters, receivers, etc.

In FIG. 12, processing circuitry 1201 can be configured to process computer instructions and data. Processing circuitry 1201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 can include two central processing units (CPUs). Data can be information in a form suitable for use by a computer.

In the depicted embodiment, input/output interface 1205 can be configured to provide a communication interface to an input device, output device, or input and output device. UE 1200 can be configured to use an output device via input/output interface 1205. An output device can use the same type of interface port as an input device. For example, a USB port can be used to provide input to and output from UE 1200. The output device can be a speaker, a sound card, a video card, a display, a monitor, a printer, an actuator, an emitter, a smartcard, another output device, or any combination thereof. UE 1200 can be configured to use an input device via input/output interface 1205 to allow and/or facilitate a user to capture information into UE 1200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 12, RF interface 1209 can be configured to provide a communication interface to RF components such as a transmitter, a receiver, and an antenna. Network connection interface 1211 can be configured to provide a communication interface to network 1243a. Network 1243a can encompass wired and/or wireless networks such as a local-area network (LAN), a wide-area network (WAN), a computer network, a wireless network, a telecommunications network, another like network or any combination thereof. For example, network 1243a can comprise a Wi-Fi network. Network connection interface 1211 can be configured to include a receiver and a transmitter interface used to communicate with one or more other devices over a communication network according to one or more communication protocols, such as Ethernet, TCP/IP, SONET, ATM, or the like. Network connection interface 1211 can implement receiver and transmitter functionality appropriate to the communication network links (e.g., optical, electrical, and the like). The transmitter and receiver functions can share circuit components, software or firmware, or alternatively can be implemented separately.

RAM 1217 can be configured to interface via bus 1202 to processing circuitry 1201 to provide storage or caching of data or computer instructions during the execution of software programs such as the operating system, application programs, and device drivers. ROM 1219 can be configured to provide computer instructions or data to processing circuitry 1201. For example, ROM 1219 can be configured to store invariant low-level system code or data for basic system functions such as basic input and output (I/O), startup, or reception of keystrokes from a keyboard that are stored in a non-volatile memory. Storage medium 1221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1221 can be configured to include operating system 1223; application program 1225 such as a web browser application, a widget or gadget engine or another application; and data file 1227. Storage medium 1221 can store, for use by UE 1200, any of a variety of various operating systems or combinations of operating systems. For example, application program 1225 can include executable program instructions (also referred to as a computer program product) that, when executed by processor 1201, can configure UE 1200 to perform operations corresponding to various exemplary methods (e.g., procedures) described herein.

Storage medium 1221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 can allow and/or facilitate UE 1200 to access computer-executable instructions, application programs or the like, stored on transitory or non-transitory memory media, to off-load data, or to upload data. An article of manufacture, such as one utilizing a communication system can be tangibly embodied in storage medium 1221, which can comprise a device readable medium.

In FIG. 12, processing circuitry 1201 can be configured to communicate with network 1243b using communication subsystem 1231. Network 1243a and network 1243b can be the same network or networks or different network or networks. Communication subsystem 1231 can be configured to include one or more transceivers used to communicate with network 1243b. For example, communication subsystem 1231 can be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver can include transmitter 1233 and/or receiver 1235 to implement transmitter or receiver functionality, respectively, appropriate to the RAN links (e.g., frequency allocations and the like). Further, transmitter 1233 and receiver 1235 of each transceiver can share circuit components, software or firmware, or alternatively can be implemented separately.

In the illustrated embodiment, the communication functions of communication subsystem 1231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 can include cellular communication, Wi-Fi communication, Bluetooth communication, and GPS communication. Network 1243b can encompass wired and/or wireless networks such as a local-area network (LAN), a wide-area network (WAN), a computer network, a wireless network, a telecommunications network, another like network or any combination thereof. For example, network 1243b can be a cellular network, a Wi-Fi network, and/or a near-field network. Power source 1213 can be configured to provide alternating current (AC) or direct current (DC) power to components of UE 1200.

The features, benefits and/or functions described herein can be implemented in one of the components of UE 1200 or partitioned across multiple components of UE 1200. Further, the features, benefits, and/or functions described herein can be implemented in any combination of hardware, software or firmware. In one example, communication subsystem 1231 can be configured to include any of the components described herein. Further, processing circuitry 1201 can be configured to communicate with any of such components over bus 1202. In another example, any of such components can be represented by program instructions stored in memory that when executed by processing circuitry 1201 perform the corresponding functions described herein. In another example, the functionality of any of such components can be partitioned between processing circuitry 1201 and communication subsystem 1231. In another example, the non-computationally intensive functions of any of such components can be implemented in software or firmware and the computationally intensive functions can be implemented in hardware.

Figure 13:
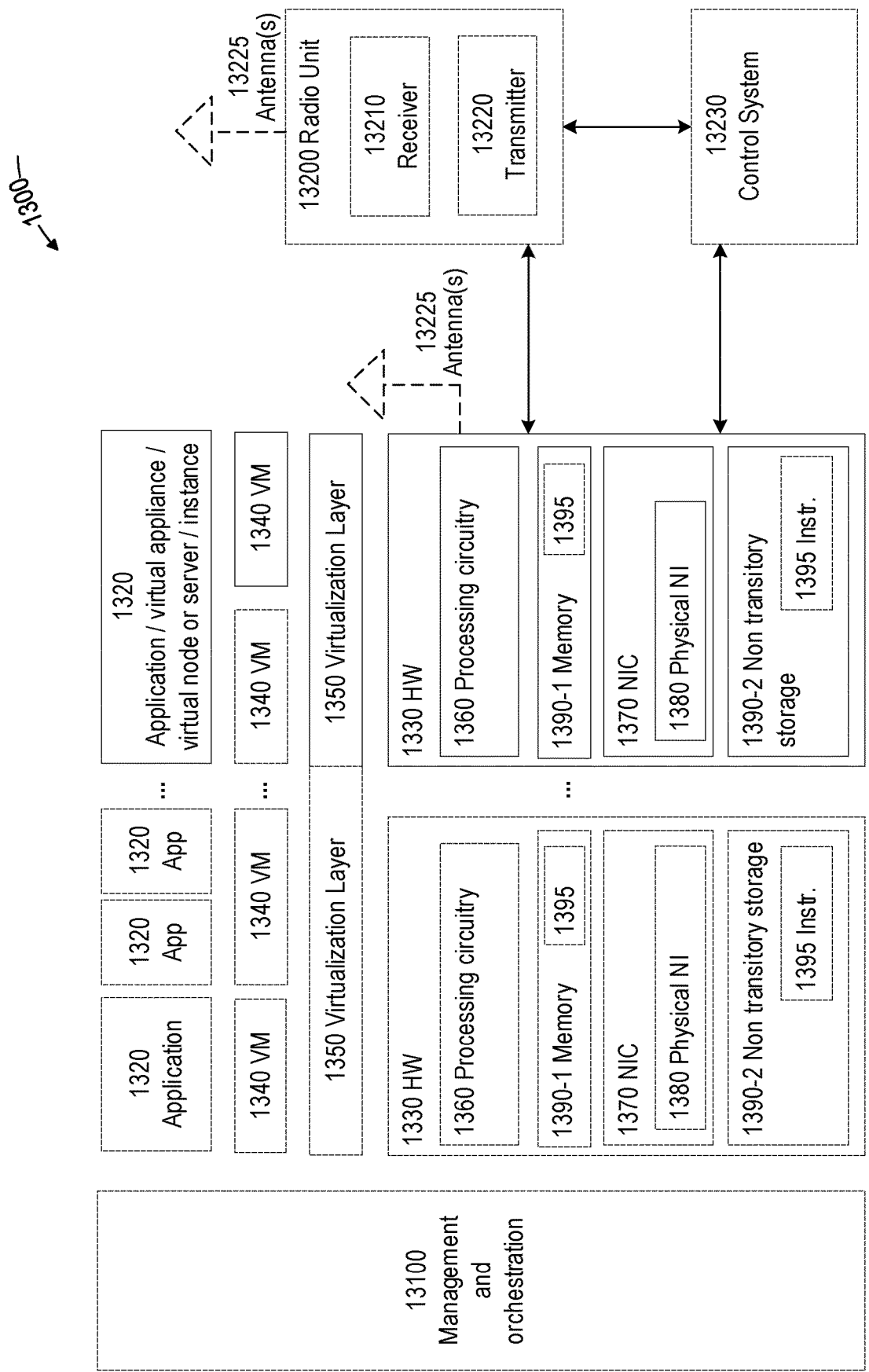
FIG. 13 is a block diagram of illustrating a virtualization environment that can facilitate virtualization of various functions implemented according to various exemplary embodiments of the present disclosure.

FIG. 13 is a schematic block diagram illustrating a virtualization environment 1300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node can be entirely virtualized.

The functions can be implemented by one or more applications 1320 (which can alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300 can include general-purpose or special-purpose network hardware devices (or nodes) 1330 comprising a set of one or more processors or processing circuitry 1360, which can be commercial off-the-shelf (COTS) processors, dedicated Application Specific Integrated Circuits (ASICs), or any other type of processing circuitry including digital or analog hardware components or special purpose processors. Each hardware device can comprise memory 1390-1 which can be non-persistent memory for temporarily storing instructions 1395 or software executed by processing circuitry 1360. For example, instructions 1395 can include program instructions (also referred to as a computer program product) that, when executed by processing circuitry 1360, can configure hardware node 1320 to perform operations corresponding to various exemplary methods (e.g., procedures) described herein. Such operations can also be attributed to virtual node(s) 1320 that is/are hosted by hardware node 1330.

Each hardware device can comprise one or more network interface controllers (NICs) 1370, also known as network interface cards, which include physical network interface 1380. Each hardware device can also include non-transitory, persistent, machine-readable storage media 1390-2 having stored therein software 1395 and/or instructions executable by processing circuitry 1360. Software 1395 can include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and can be run by a corresponding virtualization layer 1350 or hypervisor. Different embodiments of the instance of virtual appliance 1320 can be implemented on one or more of virtual machines 1340, and the implementations can be made in different ways.

During operation, processing circuitry 1360 executes software 1395 to instantiate the hypervisor or virtualization layer 1350, which can sometimes be referred to as a virtual machine monitor (VMM). Virtualization layer 1350 can present a virtual operating platform that appears like networking hardware to virtual machine 1340.

As shown in FIG. 13, hardware 1330 can be a standalone network node with generic or specific components. Hardware 1330 can comprise antenna 13225 and can implement some functions via virtualization. Alternatively, hardware 1330 can be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1340 can be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 can be coupled to one or more antennas 13225. Radio units 13200 can communicate directly with hardware nodes 1330 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 13230, which can alternatively be used for communication between the hardware nodes 1330 and radio units 13200.

Figure 14:
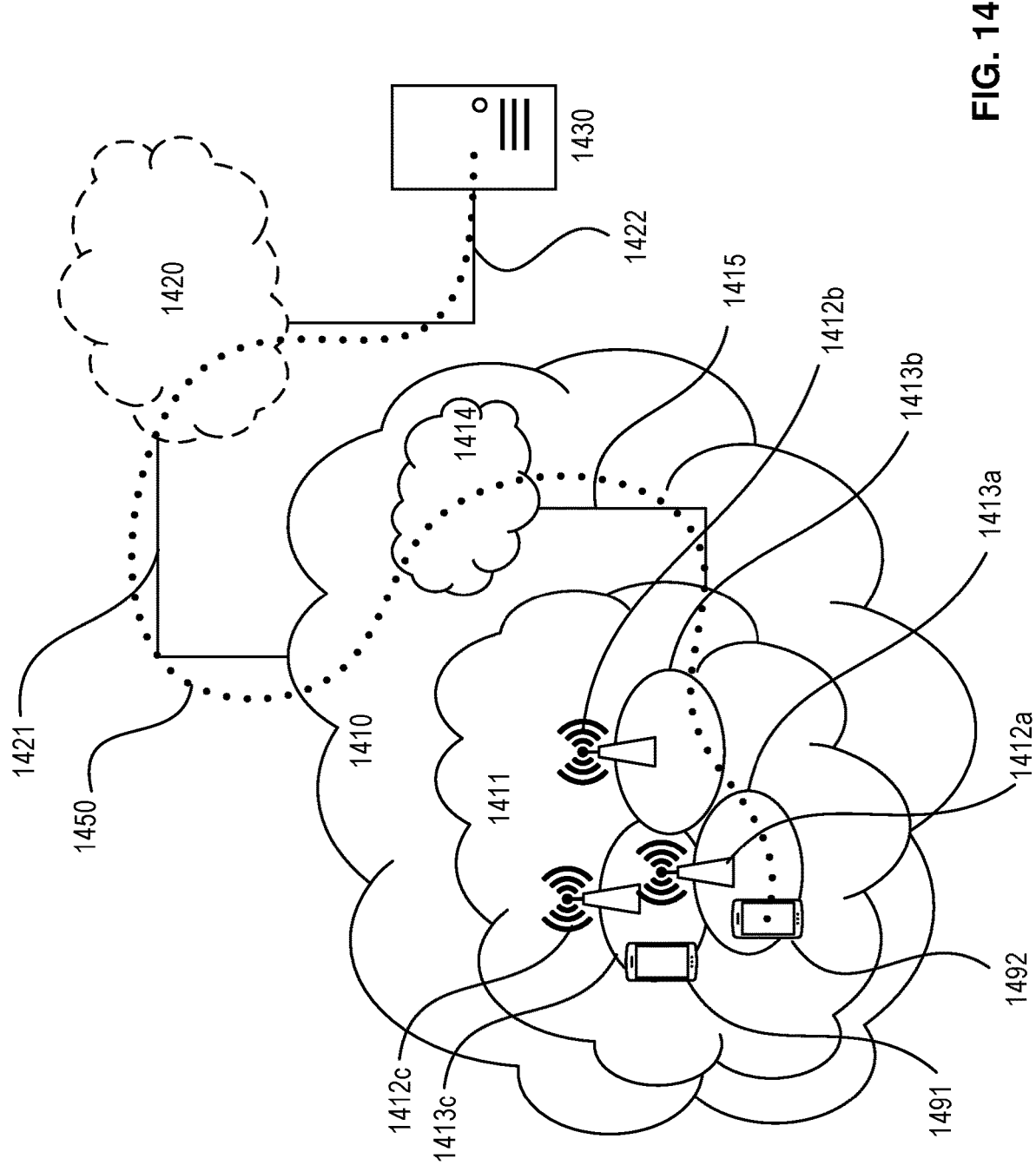
FIGS. 14-15 are block diagrams of exemplary communication systems configurable according to various exemplary embodiments of the present disclosure.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c can be configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the Telecommunication network 1410 is itself connected to host computer 1430, which can be embodied in the hardware and/or software of a standalone server, a cloud-implemented server, a distributed server or as processing resources in a server farm. Host computer 1430 can be under the ownership or control of a service provider or can be operated by the service provider or on behalf of the service provider. Connections 1421 and 1422 between telecommunication network 1410 and host computer 1430 can extend directly from core network 1414 to host computer 1430 or can go via an optional intermediate network 1420. Intermediate network 1420 can be one of, or a combination of more than one of, a public, private or hosted network; intermediate network 1420, if any, can be a backbone network or the Internet; in particular, intermediate network 1420 can comprise two or more sub-networks (not shown).

The communication system of FIG. 14 as a whole enables connectivity between the connected UEs 1491, 1492 and host computer 1430. The connectivity can be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 can be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which can have storage and/or processing capabilities. In particular, processing circuitry 1518 can comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 can be operable to provide a service to a remote user, such as UE 1530 connecting via OTT connection 1550 terminating at UE 1530 and host computer 1510. In providing the service to the remote user, host application 1512 can provide user data which is transmitted using OTT connection 1550.

Communication system 1500 can also include base station 1520 provided in a telecommunication system and comprising hardware 1525 enabling it to communicate with host computer 1510 and with UE 1530. Hardware 1525 can include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 can be configured to facilitate connection 1560 to host computer 1510. Connection 1560 can be direct, or it can pass through a core network (not shown in FIG. 15) of the telecommunication system and/or through one or more intermediate networks outside the telecommunication system. In the embodiment shown, hardware 1525 of base station 1520 can also include processing circuitry 1528, which can comprise one or more programmable processors, application-specific integrated circuits, field programmable gate arrays or combinations of these (not shown) adapted to execute instructions.

Base station 1520 also includes software 1521 stored internally or accessible via an external connection. For example, software 1521 can include program instructions (also referred to as a computer program product) that, when executed by processing circuitry 1528, can configure base station 1520 to perform operations corresponding to various exemplary methods (e.g., procedures) described herein.

Communication system 1500 can also include UE 1530 already referred to, whose hardware 1535 can include radio interface 1537 configured to set up and maintain wireless connection 1570 with a base station serving a coverage area in which UE 1530 is currently located. Hardware 1535 of UE 1530 can also include processing circuitry 1538, which can comprise one or more programmable processors, application-specific integrated circuits, field programmable gate arrays or combinations of these (not shown) adapted to execute instructions.

UE 1530 also includes software 1531, which is stored in or accessible by UE 1530 and executable by processing circuitry 1538. Software 1531 includes client application 1532. Client application 1532 can be operable to provide a service to a human or non-human user via UE 1530, with the support of host computer 1510. In host computer 1510, an executing host application 1512 can communicate with the executing client application 1532 via OTT connection 1550 terminating at UE 1530 and host computer 1510. In providing the service to the user, client application 1532 can receive request data from host application 1512 and provide user data in response to the request data. OTT connection 1550 can transfer both the request data and the user data. Client application 1532 can interact with the user to generate the user data that it provides. Software 1531 can also include program instructions (also referred to as a computer program product) that, when executed by processing circuitry 1538, can configure UE 1530 to perform operations corresponding to various exemplary methods (e.g., procedures) described herein.

Figure 15:
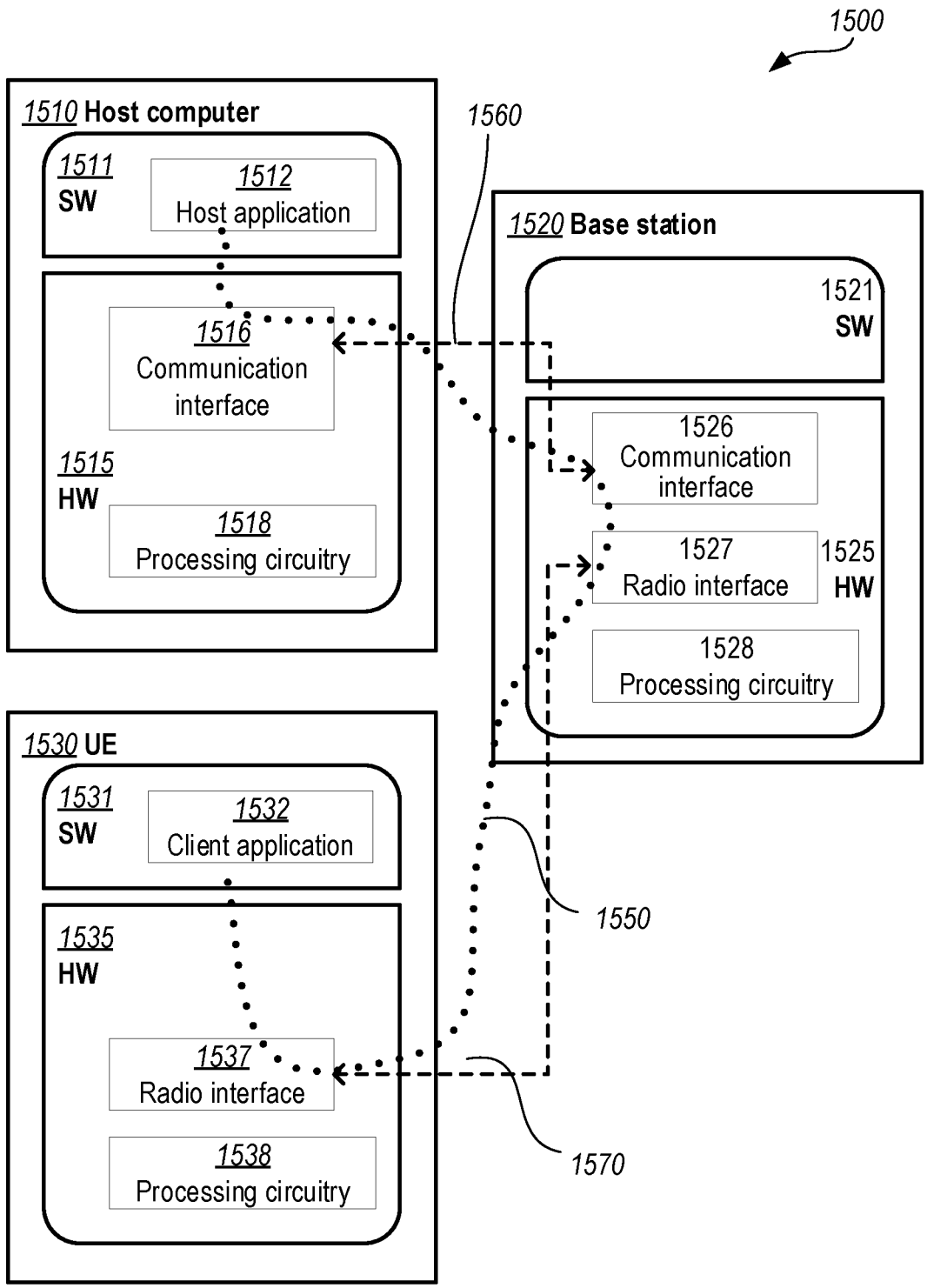

As an example, host computer 1510, base station 1520 and UE 1530 illustrated in FIG. 15 can be similar or identical to host computer 1430, one of base stations 1412a-c, and one of UEs 1491-1492 of FIG. 14, respectively. In other words, the inner workings of these entities can be as shown in FIG. 15 and the surrounding network topology can be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure can determine the routing, which it can be configured to hide from UE 1530 or from the service provider operating host computer 1510, or both. While OTT connection 1550 is active, the network infrastructure can further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1550 between host computer 1510 and UE 1530, in response to variations in the measurement results. The measurement procedure and/or the network functionality for reconfiguring OTT connection 1550 can be implemented in software 1511 and hardware 1515 of host computer 1510 or in software 1531 and hardware 1535 of UE 1530, or both. In embodiments, sensors (not shown) can be deployed in or in association with communication devices through which OTT connection 1550 passes; the sensors can participate in the measurement procedure by supplying values of the monitored quantities exemplified above, or supplying values of other physical quantities from which software 1511, 1531 can compute or estimate the monitored quantities. The reconfiguring of OTT connection 1550 can include message format, retransmission settings, preferred routing etc.; the reconfiguring need not affect base station 1520, and it can be unknown or imperceptible to base station 1520. Such procedures and functionalities can be known and practiced in the art. In certain embodiments, measurements can involve proprietary UE signaling facilitating host computer 1510's measurements of throughput, propagation times, latency and the like. The measurements can be implemented in that software 1511 and 1531 causes messages to be transmitted, in particular empty or 'dummy' messages, using OTT connection 1550 while it monitors propagation times, errors, etc.

FIG. 16 is a flowchart illustrating an exemplary method (e.g., procedure) implemented in a communication system, in accordance with one embodiment. The communication system includes a host computer, a base station, and a UE such as those described herein with reference to other figures. For simplicity of the present disclosure, only drawing references to FIG. 16 will be included in this section. In step 1610, the host computer provides user data. In substep 1611 (which can be optional) of step 1610, the host computer provides the user data by executing a host application. In step 1620, the host computer initiates a transmission carrying the user data to the UE. In step 1630 (which can be optional), the base station transmits to the UE the user data which was carried in the transmission that the host computer initiated, in accordance with the teachings of the embodiments described throughout this disclosure. In step 1640 (which can also be optional), the UE executes a client application associated with the host application executed by the host computer.

FIG. 17 is a flowchart illustrating an exemplary method (e.g., procedure) implemented in a communication system, in accordance with one embodiment. The communication system includes a host computer, a base station, and a UE such as those described herein with reference to other figures. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission can pass via the base station, in accordance with the teachings of the embodiments described throughout this disclosure. In step 1730 (which can be optional), the UE receives the user data carried in the transmission.

FIG. 18 is a flowchart illustrating an exemplary method (e.g., procedure) implemented to in a communication system, in accordance with one embodiment. The communication system includes a host computer, a base station and a UE such as those described herein with reference to other figures. For simplicity of the present disclosure, only drawing references to FIG. 18 will be included in this section. In step 1810 (which can be optional), the UE receives input data provided by the host computer. Additionally or alternatively, in step 1820, the UE provides user data. In substep 1821 (which can be optional) of step 1820, the UE provides the user data by executing a client application. In substep 1811 (which can be optional) of step 1810, the UE executes a client application which provides the user data in reaction to the received input data provided by the host computer. In providing the user data, the executed client application can further consider user input received from the user. Regardless of the specific manner in which the user data was provided, the UE initiates, in substep 1830 (which can be optional), transmission of the user data to the host computer. In step 1840 of the method, the host computer receives the user data transmitted from the UE, in accordance with the teachings of the embodiments described throughout this disclosure.

FIG. 19 is a flowchart illustrating an exemplary method (e.g., procedure) implemented in a communication system, in accordance with one embodiment. The communication system includes a host computer, a base station, and a UE such as those described herein with reference to other figures. For simplicity of the present disclosure, only drawing references to FIG. 19 will be included in this section. In step 1910 (which can be optional), in accordance with the teachings of the embodiments described throughout this disclosure, the base station receives user data from the UE. In step 1920 (which can be optional), the base station initiates transmission of the received user data to the host computer. In step 1930 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

E1. A method performed by a network node, in a radio access network (RAN), that provides a cell serving one or more user equipment (UEs), the method comprising:
  determining a utilization condition for resources associated with the cell;
  based on the utilization condition, determining a restriction to on-demand system information (SI) requests by at least one UE operating in the cell; and
  transmitting, to the at least one UE, one or more parameters associated with the restriction.

E2. The method of embodiment E1, wherein:
  the utilization condition is associated with random access channel (RACH) resources; and
  the restriction is related to on-demand SI requests during UE operation in RRC_IDLE or RRC_INACTIVE states.

E3. The method of embodiment E1, wherein:
  the utilization condition is associated with signalling radio bearer (SRB) resources; and
  the restriction is related to on-demand SI requests during UE operation in RRC_CONNECTED state.

E4. The method of any of embodiments E1-E3, wherein the parameters associated with the restriction include one or more of the following:
  a maximum number of SI blocks (SIBs) or SIB segments that a UE can request on-demand;
  a total aggregated size of SI blocks (SIBs) that a UE can request on-demand;
  a wait time between consecutive on-demand requests of a particular SIB by a single UE; and
  a prohibit time until any further on-demand SI requests can be made by the at least one UE.

E5. The method of embodiment E4, wherein the maximum number of SIBs or SIB segments and/or the total aggregated size of SIBs are associated with respective time intervals.

E6. The method of any of embodiments E1-E5, wherein:
  the restriction requirement relates to requests for a particular SI block (SIB); and
  determining the restriction is further based on the duration between updates of information comprising the particular SIB.

E7. The method of embodiment E6, wherein the parameters associated with the restriction comprise an integer multiple of the duration between updates, wherein the integer is greater than one.

E8. The method of embodiment E6, wherein:
  the particular SIB comprises global navigation satellite system (GNSS) positioning assistance information; and
  the rate of change relates to real-time kinematic (RTK) information.

E9. The method of any of embodiments E1-E8, wherein
  the restriction is determined with respect to a single UE; and
  the parameters are transmitted to the single UE in a dedicated radio resource control (RRC) message.

E10. The method of any of embodiments E1-E8, wherein:
  the restriction is determined with respect to all UEs operating in the cell; and
  the parameters are transmitted to all UEs via a broadcast SI block.

E11. The method of any of embodiments E1-E10, further comprising:
  receiving, from a particular UE, one or more requests for the one or more SI messages in accordance with the transmitted parameters; and
  subsequently transmitting the requested one or more SI messages to the UE via broadcast or dedicated signalling.

E12. A method performed by a user equipment (UE) operating in a cell provided by a network node in a radio access network (RAN), the method comprising:
receiving, from the network node, one or more parameters associated with a restriction to on-demand system information (SI) requests by the UE in the cell;
determining a need for information comprising one or more SI messages; and
transmitting, to the network node, a request for the one or more SI messages in accordance with the received parameters.

E13. The method of embodiment E12, further comprising subsequently receiving, from the network node, the requested one or more SI messages via broadcast or dedicated signalling.

E14. The method of any of embodiments E12-E13, wherein the parameters associated with the restriction include one or more of the following:
a maximum number of SI blocks (SIBs) or SIB segments that a UE can request on-demand;
a total aggregated size of SI blocks (SIBs) that a UE can request on-demand;
a wait time between consecutive on-demand requests of a particular SIB by a single UE; and
a prohibit time until any further on-demand SI requests can be made by the at least one UE.

E15. The method of embodiment E14, wherein the maximum number of SIBs or SIB segments and the total aggregated size of SIBs are associated with respective time intervals.

E16. The method of any of embodiments E12-E15, wherein:
the restriction is related to on-demand SI requests during UE operation in RRC_IDLE or RRC_INACTIVE states; and
the request is transmitted during a random access procedure on a random access channel (RACH) in the cell.

E17. The method of any of embodiments E12-E15, wherein:
the restriction is related to on-demand SI requests during UE operation in RRC_CONNECTED state; and
the request is transmitted in one of the following dedicated messages: RRCSetup, RRCResume, or RRCReconfiguration.

E18. The method of any of embodiments E12-E17, wherein:
the restriction is related to requests for a particular SI block (SIB); and
the parameters associated with the restriction comprise an integer multiple of the duration between updates, wherein the integer is greater than one.

E19. The method of embodiment E18, wherein:
the particular SIB comprises global navigation satellite system (GNSS) positioning assistance information; and
the rate of change relates to real-time kinematic (RTK) information.

E20. The method of any of embodiments E12-E19, wherein the parameters are received via one of the following: a dedicated radio resource control (RRC) message, or a broadcast SI block.

E21. A network node configured to provide a cell serving one or more user equipment (UEs) in a radio access network (RAN), the network node comprising:
radio interface circuitry configured to communicate with the UEs via the cell; and
processing circuitry operably coupled to the radio interface circuitry, whereby the processing circuitry and the radio interface circuitry are configured to perform operations corresponding to any of the methods of embodiments E1-E11.

E22. A network node configured to provide a cell serving one or more user equipment (UEs) in a radio access network (RAN), the network node being further arranged to perform operations corresponding to any of the methods of embodiments E1-E11.

E23. A non-transitory, computer-readable medium storing computer-executable instructions that, when executed by processing circuitry of a network node in a radio access network (RAN), configure the network node to perform operations corresponding to any of the methods of embodiments E1-E11.

E24. A computer program product comprising computer-executable instructions that, when executed by processing circuitry of a network node in a radio access network (RAN), configure the network node to perform operations corresponding to any of the methods of embodiments E1-E11.

E25. A user equipment (UE) configured to operate in a cell provided by a network node in a radio access network (RAN), the UE comprising:
radio interface circuitry configured to communicate with the network node via the cell; and
processing circuitry operably coupled to the radio interface circuitry, whereby the processing circuitry and the radio interface circuitry are configured to perform operations corresponding to any of the methods of embodiments E12-E20.

E26. A user equipment (UE) configured to operate in a cell provided by a network node in a radio access network (RAN), the UE being further arranged to perform operations corresponding to any of the methods of embodiments E12-E20.

E27. A non-transitory, computer-readable medium storing computer-executable instructions that, when executed by processing circuitry of a user equipment, configure the user equipment to perform operations corresponding to any of the methods of embodiments E12-E20.

E28. A computer program product comprising computer-executable instructions that, when executed by processing circuitry of a user equipment, configure the user equipment to perform operations corresponding to any of the methods of embodiments E12-E20.

The invention claimed is:

1. A method for a network node, of a radio access network, RAN, that provides a cell serving one or more user equipment (UEs), the method comprising:
determining a restriction to requests for on-demand delivery of system information blocks (SIBs) by at least one UE operating in the cell, wherein:
SIBs available for on-demand delivery includes global navigation satellite system (GNSS) positioning assistance information, and
determining the restriction is based on a duration between updates of real-time kinematic information comprising the GNSS positioning assistance information; and
transmitting, to the at least one UE, one or more parameters associated with the restriction.

2. The method of claim 1, wherein the one or more parameters include any of the following:
a prohibit timer value that indicates a duration, after a UE requests on-demand delivery of one or more SIBs, until the UE can request on-demand delivery of one or more further SIBs; and
a maximum number of SIBs or SIB segments that a UE can request for on-demand delivery.

3. The method of claim 1, wherein the restriction comprises enabling or disabling requests for on-demand delivery of SIBs individually for each UE of the at least one UE.

4. The method of claim 1, wherein:
the restriction is for requests for on-demand delivery of SIBs during UE operation in RRC_CONNECTED state; and
the one or more parameters are transmitted in respective RRCReconfiguration messages to the at least one UE.

5. The method of claim 4, wherein transmitting the one or more parameters in an RRCReconfiguration message to a particular UE indicates that requests for on- demand delivery of SIBs are enabled for the particular UE.

6. The method of claim 1, further comprising determining a utilization condition for resources associated with the cell, wherein:
the restriction is determined based on the utilization condition; and
the utilization condition is for one of the following: signaling radio bearer (SRB) resources; or random-access channel (RACH) resources.

7. The method of claim 1, wherein:
the method further comprises obtaining respective quality of service (QOS) requirements for the at least one UE; and
the restriction for the at least one UE comprises respective restrictions based on the respective QoS requirements.

8. The method of claim 7, wherein determining the restriction comprises:
comparing the respective QoS requirements to a threshold;
determining that requests for on-demand delivery of SIBs are enabled for UEs whose QoS requirement is greater than or equal to the threshold; and
determining that requests for on-demand delivery of SIBs are disabled for UEs whose QOS requirement is less than the threshold.

9. The method of claim 1, further comprising:
receiving, from a particular UE, a request for on-demand delivery of one or more particular SIBs in accordance with the parameters associated with the restriction; and
transmitting the requested one or more particular SIBs to the UE via broadcast or dedicated signaling.

10. The method of claim 9, wherein the one or more particular SIBs include global navigation satellite system (GNSS) positioning assistance information.

11. A method for a user equipment (UE) operating in a cell provided by a network node in a radio access network (RAN), the method comprising:
receiving, from the network node, one or more parameters associated with a restriction to requests, by at least the UE, for on-demand delivery of system information blocks (SIBs) by the network node; and transmitting, to the network node, a request for on-demand delivery of one or more particular SIBs in accordance with the parameters associated with the restriction, wherein: the one or more particular SIBs include global navigation satellite system (GNSS) positioning assistance information; and the restriction is based on a duration between updates of real-time kinematic information comprising the GNSS positioning assistance information.

12. The method of claim 11, wherein the one or more parameters include any of the following:

a prohibit timer value that indicates a duration, after a UE requests on-demand delivery of one or more SIBs, until the UE can request on-demand delivery of one or more further SIBs; and
a maximum number of SIBs or SIB segments that a UE can request for on-demand delivery.

13. The method of claim 12, wherein:
the method further comprises starting a timer, based on the received prohibit timer value, in relation to a previous request for on-demand delivery for one or more previous SIBs; and
transmitting the request in accordance with the parameters comprises determining that the prohibit timer has expired before transmitting the request.

14. The method of claim 12, wherein the one or more particular SIBs requested for on-demand delivery comprise a plurality of SIBs or SIB segments less than or equal to the maximum number.

15. The method of claim 11, wherein:
the restriction is for requests for on-demand delivery of SIBs during UE operation in RRC_CONNECTED state; and
the one or more parameters are received in an RRCReconfiguration message.

16. The method of claim 15, wherein:
transmitting the request is based on an indication that requests for on-demand delivery of SIBs are enabled for the UE; and
the indication is based on receiving the one or more parameters in the RRCReconfiguration message.

17. The method of claim 11, wherein:
the request for on-demand delivery of the one or more particular SIBs is transmitted in response to initiating a GNSS positioning procedure.

18. The method of claim 11, wherein:
the UE is operating in RRC_CONNECTED state with a quality-of-service (QOS) requirement; and
the restriction is based on the UE's QOS requirement.

19. The method of claim 11, further comprising receiving the requested one or more particular SIBs from the network node via broadcast or dedicated signaling.

20. A network node configured to provide a cell serving one or more user equipment (UEs) in a radio access network (RAN), the network node comprising:
radio interface circuitry configured to communicate with the UEs via the cell; and
processing circuitry operably coupled to the radio interface circuitry, whereby the processing circuitry and the radio interface circuitry are configured to perform operations corresponding to the method of claim 1.

21. A non-transitory, computer-readable medium storing computer- executable instructions that, when executed by processing circuitry of a network node configured to provide a cell serving one or more user equipment (UEs) in a radio access network (RAN), configure the network node to perform operations corresponding to the method of claim 1.

22. A user equipment (UE) configured to operate in a cell provided by a network node in a radio access network (RAN), the UE comprising:
radio interface circuitry configured to communicate with the network node via the cell; and
processing circuitry operably coupled to the radio interface circuitry, whereby the processing circuitry and the radio interface circuitry are configured to perform operations corresponding to the method of claim 11.

23. A non-transitory, computer-readable medium storing computer-executable instructions that, when executed by processing circuitry of a user equipment (UE) configured to operate in a cell provided by a network node in a radio access network (RAN), configure the UE to perform operations corresponding to the method of claim 11.

* * * * *

UNITED STATES PATENT AND TRADEMARK OFFICE
CERTIFICATE OF CORRECTION

| | |
|---|---|
| PATENT NO. | : 12,082,096 B2 |
| APPLICATION NO. | : 17/637962 |
| DATED | : September 3, 2024 |
| INVENTOR(S) | : Shreevastav et al. |

Page 1 of 1

It is certified that error appears in the above-identified patent and that said Letters Patent is hereby corrected as shown below:

In the Specification

In Column 3, Line 28, delete "IT" and insert -- UE --, therefor.

In Column 18, Line 26, delete "expiration Time" and insert -- expirationTime --, therefor.

In Column 29, Line 27, delete "ower" and insert -- Power --, therefor.

Signed and Sealed this
Eighteenth Day of February, 2025

Coke Morgan Stewart
*Acting Director of the United States Patent and Trademark Office*